(12) United States Patent
Sivapathasundram et al.

(10) Patent No.: US 8,849,713 B2
(45) Date of Patent: Sep. 30, 2014

(54) DYNAMIC CURRENCY CONVERSION SYSTEM AND METHOD

(75) Inventors: Sumithran Sivapathasundram, Surbiton (GB); Puay Hiang Tan, Singapore (SG); Anthony Donohue, New York, NY (US); Gareth Lewis, Sydney (AU)

(73) Assignee: Global Blue Currency Choice Holdings B.V. (NL)

( * ) Notice: Subject to any disclaimer, the term of this patent is extended or adjusted under 35 U.S.C. 154(b) by 684 days.

(21) Appl. No.: 12/920,893

(22) PCT Filed: Mar. 6, 2009
(Under 37 CFR 1.47)

(86) PCT No.: PCT/GB2009/000623
§ 371 (c)(1),
(2), (4) Date: Aug. 12, 2011

(87) PCT Pub. No.: WO2009/112812
PCT Pub. Date: Sep. 17, 2009

(65) Prior Publication Data
US 2012/0036063 A1    Feb. 9, 2012

(30) Foreign Application Priority Data

Mar. 10, 2008  (GB) .................................. 0804413.3
May 7, 2008    (SG) .................................. 200803501

(51) Int. Cl.
*G06Q 40/00* (2012.01)
*G06Q 20/14* (2012.01)
*G06Q 20/24* (2012.01)
*G06Q 20/38* (2012.01)
*G06Q 20/10* (2012.01)
*G06Q 20/04* (2012.01)

(52) U.S. Cl.
CPC ................ *G06Q 20/24* (2013.01); *G06Q 20/14* (2013.01); *G06Q 20/381* (2013.01); *G06Q 20/10* (2013.01); *G06Q 20/04* (2013.01)
USPC .......................................................... 705/39

(58) Field of Classification Search
USPC .......................................................... 705/39
See application file for complete search history.

(56) References Cited

U.S. PATENT DOCUMENTS 6,072,870 A  *  6/2000  Nguyen et al. .................. 705/79
7,328,188 B1 *  2/2008  Barry .............................. 705/40

(Continued)

FOREIGN PATENT DOCUMENTS

JP    2002-150188          5/2002
WO    WO 03/067535    *   8/2003   .............. G07F 19/00

(Continued)

OTHER PUBLICATIONS

Search Report and Written Opinion in Singapore Application No. 201006171-1 dated Oct. 17, 2011, 17 pages.

(Continued)

*Primary Examiner* — Eric T Wong

(57) ABSTRACT

A transaction terminal system for a card-based purchase communicates with a host system to provide dynamic currency conversion. The transaction terminal system can select one of a number of different rate request messages according to various local factors in order to obtain a currency conversion rate for dynamic currency conversion.

50 Claims, 9 Drawing Sheets

(56) References Cited

U.S. PATENT DOCUMENTS

| | | | |
|---|---|---|---|
| 2003/0046234 A1 | 3/2003 | Takadachi | |
| 2003/0126063 A1 | 7/2003 | Reuter et al. | |
| 2004/0148255 A1* | 7/2004 | Beck et al. | 705/39 |
| 2004/0167863 A1 | 8/2004 | Knowles et al. | |
| 2005/0154674 A1* | 7/2005 | Nicholls et al. | 705/43 |
| 2006/0022032 A1 | 2/2006 | Fillinger et al. | |
| 2007/0214054 A1* | 9/2007 | Cleary et al. | 705/16 |
| 2009/0177579 A1* | 7/2009 | Ling | 705/39 |
| 2010/0036741 A1* | 2/2010 | Cleven | 705/17 |

FOREIGN PATENT DOCUMENTS

| | | |
|---|---|---|
| WO | 2004/044822 | 5/2004 |
| WO | 2004044822 | 5/2004 |
| WO | WO 2004044822 A2 * | 5/2004 |
| WO | 2006/032849 | 3/2006 |

OTHER PUBLICATIONS

Singapore Written Opinion by the Danish Patent and Trademark Office in SG Appl. No. 201006171-1, dated Oct. 17, 2011, 17 pages.
International Preliminary Report on Patentability in application No. PCT/EP2009/000623 mailed Sep. 23, 2010.
Office Action in Japanese Application No. 2010-550251 issued Jul. 2, 2013, 11 pages.
Office Action in Japanese Application No. 2010-550251 issued Oct. 8, 2013, 7 pages.
Patent Examination Report No. 1 in Australian Application No. 2009223984 dated Jan. 2, 2014, 4 pages.

* cited by examiner

DYNAMIC CURRENCY CONVERSION SYSTEM AND METHOD

BACKGROUND

The present invention relates to a card-based system that can offer a user (e.g., a payment card holder) an alternative currency for payment.

A typical transaction terminal system, for example an automatic teller machine, a point of sale terminal, a workstation of the like, will offer transactions in a currency local to the transaction terminal system. However, sometimes users would wish to make a transaction in an alternative currency.

There is a need automatically to identify payments for which a user may wish to make a payment in a currency other than the currency local to the transaction terminal system. Some approaches to provide for the automatic determination of a currency for dynamic currency conversion have been proposed.

For example EP 1,018,711 discloses an approach that includes identifying an identifier code from a payment card number and comparing this to entries in a table containing issuer codes and a corresponding currency code to determine an operating currency for association with a card transaction.

International patent application WO 2006/009816 discloses an approach that includes a financial account number associated with a financial institution maintained by a customer being received, a foreign currency type associated with the financial account is determined, and a choice is presented to the user, the currency transaction then being conducted in accordance with a currency selection of the customer.

Depending upon technical and legislative requirements, different options for automatically determining a currency for currency conversion may not be available in all locations at which a card transaction terminal may be located. Accordingly, it has traditionally been necessary to support multiple card transaction terminals in order to address these needs.

SUMMARY

One aspect can provide a transaction terminal system that includes an input interface to receive payment card details and transaction details, a communications interface to connect to a remote host system, and processing logic operable to transmit a rate request message to the host system to identify a dynamic currency conversion rate, and to receive a response message from the host system. A rate request message can include a request type indicator indicative of one of plurality of rate request message types and wherein, a rate request message for at least a selected rate request message type includes a conversion currency field for a conversion currency indicator.

A method of operating a transaction terminal system can comprise: receiving payment card details and transaction details; transmitting a rate request message to a host system to identify a dynamic currency conversion rate, wherein a rate request message includes a request type indicator indicative of one of plurality of rate request message types and wherein a rate request message for at least a selected rate request message type includes a conversion currency field for a conversion currency indicator; and receiving a response message from the host system.

Another aspect can provide a dynamic currency conversion host system comprising a host communications interface to connect to a transaction terminal system and host processing logic operable to receive a rate request message from the transaction terminal. A rate request message can include a request type indicator indicative of one of plurality of rate request message types and a rate request message for at least a selected rate request message type can include a conversion currency field for a conversion currency indicator. The processing logic can further be operable to determine a conversion rate in response to a rate request message that includes an indicated conversion currency or to determine a conversion currency and a conversion rate for the determined conversion currency in response to a rate request message without an indicated conversion currency. The processing logic can transmit to the transaction terminal system a rate response message that includes a conversion currency indicator and a conversion rate indicator for that currency.

A method of operating a dynamic currency conversion host system can comprise: receiving a rate request message from a transaction terminal system, wherein a rate request message includes a request type indicator indicative of one of plurality of rate request message types and wherein a rate request message for at least a selected rate request message type includes a conversion currency field for a conversion currency indicator; determining a conversion rate in response to a rate request message that includes an indicated conversion currency, or determining a conversion currency and a conversion rate for the determined conversion currency in response to a rate request message without an indicated conversion currency; and transmitting to the transaction terminal system a rate response message that includes a conversion currency indicator and a conversion rate indicator for that currency.

A dynamic currency conversion system can include one or more such transaction terminal systems and one or more such dynamic currency conversion host systems.

Although various aspects of the invention are set out in the accompanying claims, other aspects of the invention include any combination of features from the described embodiments and/or the accompanying dependent claims with the features of the independent claims, and not solely the combinations explicitly set out in the accompanying claims.

BRIEF DESCRIPTION OF THE DRAWINGS

Embodiments are described, by way of example only, with reference to the accompanying drawings.

DETAILED DESCRIPTION

Figure 1:
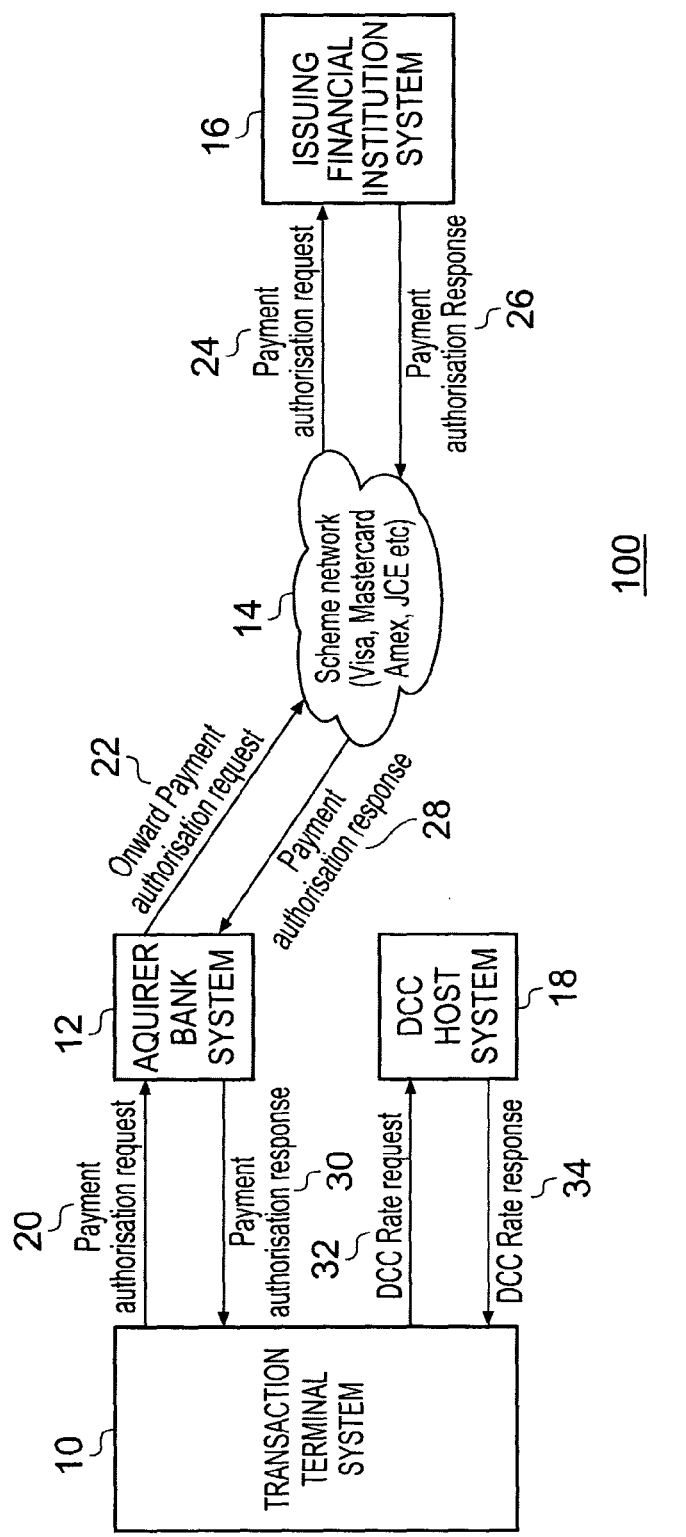
FIG. 1 is a schematic block diagram illustrating an example of a configuration of a card payment system providing dynamic currency conversion.

FIG. 1 is a schematic block diagram illustrating an example of a payment card system 100.

FIG. 1 illustrates a transaction terminal system (or transaction station system) 10 that includes card payment functionality and additionally includes dynamic currency conversion (DCC) system functionality. The transaction terminal system 10 can be configured as a point of sale terminal located, for example, in the premises of a retailer, or may, for example, be an automated teller machine.

The transaction terminal system 10 can include one or more interfaces for receiving card payment and purchase details. The transaction terminal system 10 is in communication via a communications network (for example via the Internet, a telephone network or another network) with a computer system 12 of a bank that provides banking services for the retailer, hereinafter referred to as an acquirer bank system 12. As a part of processing a card payment, the transaction terminal system 10 generates a payment authorisation request message 20.

The acquirer bank system 12 can include one or more computers. The acquirer bank system 12 can be operable to receive the payment authorisation request message 20 from the transaction terminal system 10 and to return an authorisation response message 30 in due course to the transaction terminal system 10. The acquirer bank system 12 is further in communication via a communications network (for example via the Internet, a telephone network or another network) with a network 14 of computer systems of a payment card operator (hereinafter referred to as the scheme network system 14). Although only one scheme network system 14 is shown in FIG. 1, the acquirer bank system 12 will be in communication with respective scheme networks systems for respective payment card operators.

The acquirer bank system 12 is operable to analyse a payment authorisation request message 20 received from the transaction terminal system 10 to determine an appropriate scheme network system 14 for the card concerned and to forward a payment authorisation request message 22 to the appropriate scheme network system 14.

The scheme network system 14 can be operable to receive the payment authorisation request message 22 from the acquirer bank system 12 and to return an authorisation response message 28 in due course to the acquirer bank system 12. The scheme network system 14 is further in communication via a communications network (for example via the Internet, a telephone network or another network) with a computer system 16 of a financial institution that issued the payment card (hereinafter referred to as the issuing financial institution system). Although only one issuing financial institution system 16 is shown in FIG. 1, the scheme network system 14 can be in communication with respective issuing financial institution systems 16 for respective issuing financial institutions.

The scheme network system 14 can be operable to analyse the received payment authorisation request message 22 to identify the issuing financial institution that issued the payment card. The scheme network system 14 is then operable to forward a payment authorisation request message 24 to the issuing financial institution system 16 concerned, and to receive a response message 26 from the issuing financial institution system 16.

The issuing financial institution system 16 can be operable to receive the payment authorisation request message 24, to process the authorisation request by comparing the details of the payment request to records held for the payment card concerned, and then to transmit an appropriate authorisation response message 26 to the scheme network system 14. The authorisation response message includes various details including confirmation as to whether the payment is authorised or not. The authorisation response message 26 is then forwarded via the scheme network system 14, the acquirer bank system 12 to the transaction terminal system 10.

In the following, further detail will be given of rate request and rate response messages passed between the transaction terminal system 10 and the DCC host system 18 to determine whether a DCC operation is to be performed.

On confirmation of a currency for a transaction, the transaction terminal system 10 can be operable to transmit an authorization request message or a financial presentment request message or a financial presentment advice message or clearing message (e.g., for the card holder's home or billing currency) to the issuing financial institution 16 via the acquirer bank system 12 and the scheme network systems 14.

Figure 2:
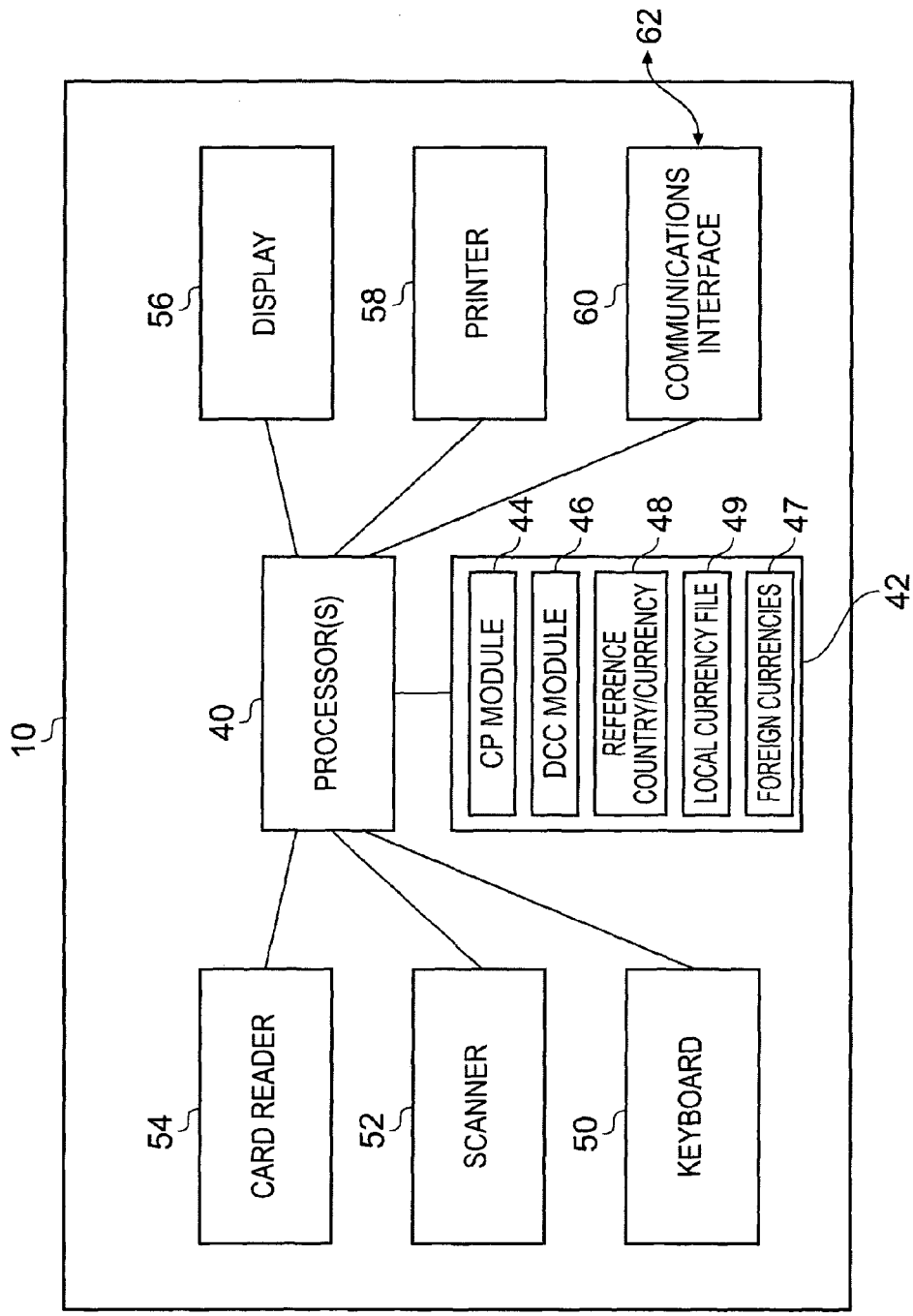
FIG. 2 is a block diagram illustrating an example of a transaction terminal system.

FIG. 2 is a schematic block diagram of an example of a transaction terminal system 10. The example transaction terminal system 10 illustrated in FIG. 2 includes one or more processors 40, storage 42 (which can include volatile and non-volatile memory and storage), for the storage of programs and data. FIG. 2 illustrates that the storage 42 includes a card processing application forming a card processing (CP) application module 44, a DCC application forming a DCC module 46 and reference country and/or currency information 48, a local currency card file 49 that identifies cards that have been issued in a currency local to the terminal (which file can take various forms including, for example, an Issuer Identification Number/Bank Identifier Number (IIN/BIN) table 49) and a foreign currency table 47. It should be noted that the storage 42 can contain other applications and data.

The reference country/currency information 48 can be held, for example as an ISO country code and an alpha currency code and/or a numeric currency code in a file in the storage 42 or in a register.

Where the local currency card file is implemented as a local IIN/BIN table 49, this can identify local banks and other financial institutions for which a payment card has the local currency of the transaction terminal as the billing currency for the payment card, whereby the user (card holder) for the payment card would not be eligible for dynamic currency conversion. Individual entries in a local IIN/BIN table can include various fields including, for example, one or more of the following fields for:

an IIN/BIN;
an alpha billing currency code (e.g., an alpha ISO currency code);
a numeric billing currency code (e.g., a numeric ISO currency code);
a country code (e.g., an ISO country code).

The foreign currency table 47 can include indications of foreign currencies supported for dynamic currency conversion by the transaction terminal system 10. Individual entries in the foreign currency table 47 can include various fields including, for example, one or more of the following fields for:

an alpha foreign currency code (e.g., an alpha ISO currency code);
a numeric foreign currency code (e.g., a numeric ISO currency code).

FIG. 2 also represents, schematically, a keyboard/keypad 50, a scanner 52 and a card reader 54. The keyboard/keypad 50 can be keyboard/keypad with separate keys, or can be configured as a touch screen keyboard/keypad and can be used for the input of numerical and/or other characters as appropriate. The scanner 52 can, for example be a bar code scanner, an RFI tag scanner or the like. The card reader 54 can be configured to read data from a payment card. The card reader 54 can be a magnetic stripe reader, a contact chip card reader, a contactless chip card reader, an RFI tag reader, etc., as appropriate. Also, where appropriate, the card reader 54 can also be operable to write information to a suitably configured payment card.

FIG. 2 further represents, schematically, a display 56, a printer 58 and a communication interface 60. The display 56 can be a numeric display, an alphanumeric display, an image display, etc., as appropriate to display input data and/or messages to assist the user (e.g., a payment card holder) and/or a retailer/merchant in operation of the transaction terminal system 10. The printer can be used for printing purchase receipts and/or other information. The communications interface 60 enables communications via one or more communications channels 62 from the transaction terminal system 10 to the DCC host system 18, either directly or via an intermediate network (not shown).

In the example described above, the transaction terminal system 10 is a payment acceptance device or an automated teller system or a point of sale system. However, it should be understood that the transaction terminal system 10 could also be in the form of a workstation connected to the Internet. The transaction terminal system may also be fully or partially integrated into the transaction system of a hotel, theatre, retail establishment, or the like.

Figure 3:
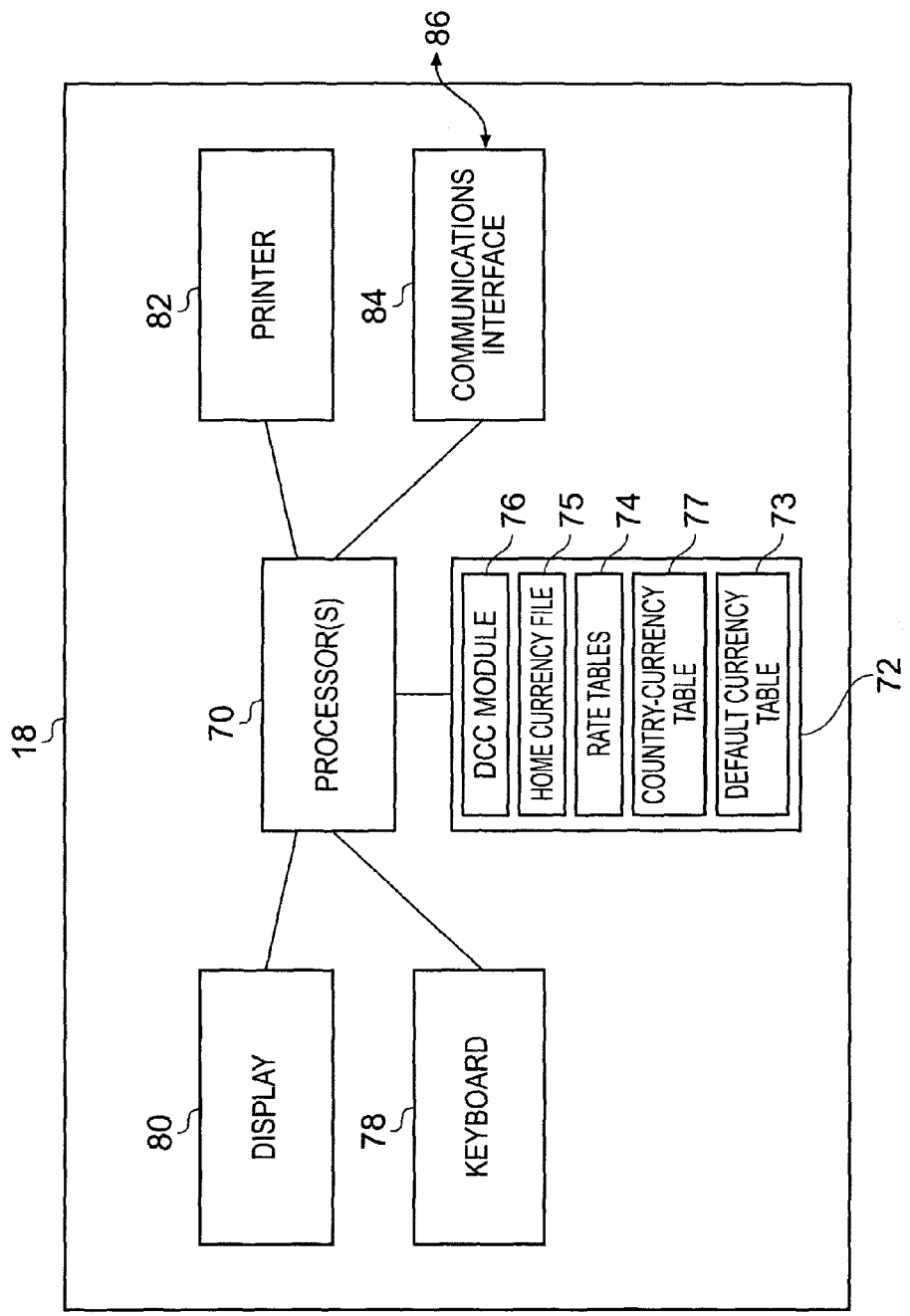
FIG. 3 is a block diagram illustrating an example of a dynamic currency conversion host system.

FIG. 3 is a schematic block diagram of an example of a DCC host system 18. The example DCC host system 18 illustrated in FIG. 3 includes one or more processors 70, storage 72 (which can include volatile and non-volatile memory), for the storage of programs and data. FIG. 3 illustrates that the storage 72 includes one or more DCC programs forming a DCC module 76 and one or more data tables including a home currency file 75, currency conversion, or exchange rate tables 74, a country to currency table 77 and a default currency table 73. It should be noted that the storage 72 can contain other applications and data.

The home currency file 75 can, for example, be in the form of a billing currency file (BCF 75) that can have entries that can include various fields, including, for example, fields for:
  an account billing file identifier;
  a lower value of card account number range;
  a upper value of card account number range; and
  an alpha billing currency code (e.g., a 2-3 character alpha ISO currency code);
  a numeric billing currency code (e.g., a 3-digit numeric ISO currency code);

The exchange rate tables 74 can contain information from which current exchange rate data can be extracted. A header entry in the exchange rate table can include various fields, including for example, one or more of the following fields for:
  an outgoing file prefix;
  a file identifier;
  a start effective date;
  a start effective time;
  a base currency code (e.g., using an ISO currency code);
  a country code (e.g., using an ISO country code);
  a file sequence number (e.g., 001, unless more than one file for the date);
  a file extension (e.g., DAT).

A volume in the exchange rate tables 74 can include various fields, including, for example, one or more of the following fields for:
  a volume header;
  a start effective date;
  a start effective time;
  a Rate ID.

Individual exchange rate entries in the exchange rate tables 74 can include various fields, including, for example, one or more of the following fields for:
  an alpha currency code (e.g., an ISO standard 3 character alpha code);
  a numeric currency code (e.g., an ISO standard 2-3 character numeric code);
  a Euroband indicator (e.g., a flag to indicate whether the currency is a Euroband currency);
  an exchange rate (e.g., a rate of exchange rounded to 4 decimal places);
  a merchant FX-rate category;
  a valid from date (e.g., the date from which the exchange rate is valid);
  a valid from time (e.g., the time on that date from which the exchange rate is valid);
  a valid to date (e.g., the date after which the exchange rate is not valid);
  a valid to time (e.g., the time on that date after which the exchange rate is not valid);
  a markup percentage value;
  a markup precision value (e.g., to indicate a markup decimal place precision).

A final field in the exchange rate tables 74 can include various fields, including, for example, one or more of the following fields for:
  a trailer line;
  a checksum on the currency code field;
  a checksum on the exchange rate field;
  a record count.

A country to currency table 77 is used to map between a country and its official national currency. Typically one official national currency is associated with per country, but there may be multiple countries associated with one official national currency, e.g., EURO. In one example, the country to currency table is arranged by country and each entry for a country identifies an official national currency associated therewith: In this example, each entry can include one or more fields including, for example, one or more of the following fields:
  a country code (e.g., an ISO country code);
  an alpha currency code (e.g., an ISO standard 3 character alpha code);
  a numeric currency code (e.g., an ISO standard 2-3 character numeric code).

The default currency table 73 can be used to identify a default currency to be used for a transaction. The default currency table 73 can include, for example, a mapping between a non-supported DCC currency and a default supported DCC currency and can be used in certain circumstances to identify a default DCC currency to be used when a payment card is used that was issued for a currency that is not supported by the transaction terminal system 10 and/or the direct currency conversion host system 18. It can also be used in certain circumstances to identify a default DCC currency to be used for a payment card that is not issued for the local currency for the transaction terminal system 10. In one example, the default currency table 73 is arranged by input currency (e.g., the currency local to the terminal payment system and/or a non-supported currency, etc.) and each entry for an input currency identifies a corresponding default currency associated therewith. In this example, each entry can include one or more fields including, for example, one or more of the following fields:
  an alpha input currency code (e.g., an ISO standard 3 character alpha code);
  a numeric input currency code (e.g., an ISO standard 2-3 character numeric code);
  an alpha default currency code (e.g., an ISO standard 3 character alpha code);
  a numeric default currency code (e.g., an ISO standard 2-3 character numeric code)

FIG. 3 also represents, schematically, a keyboard 78 and a display 80. The keyboard 78 can be keyboard with separate keys, or can be configured as a touch screen keyboard and can be used for the input of numerical and/or other characters as appropriate. The display 80 can be a numeric display, an alphanumeric display, an image display, etc. as appropriate to enable an operator to view system data.

FIG. 3 further illustrates a printer 82 and a communications interface 84. The printer can be used for printing system data. The communications interface 84 enables communication via one or more communication channels 86 with the transaction terminal system 10 and the acquirer bank system 12, either directly or via intermediate networks (not shown).

Figure 4A:
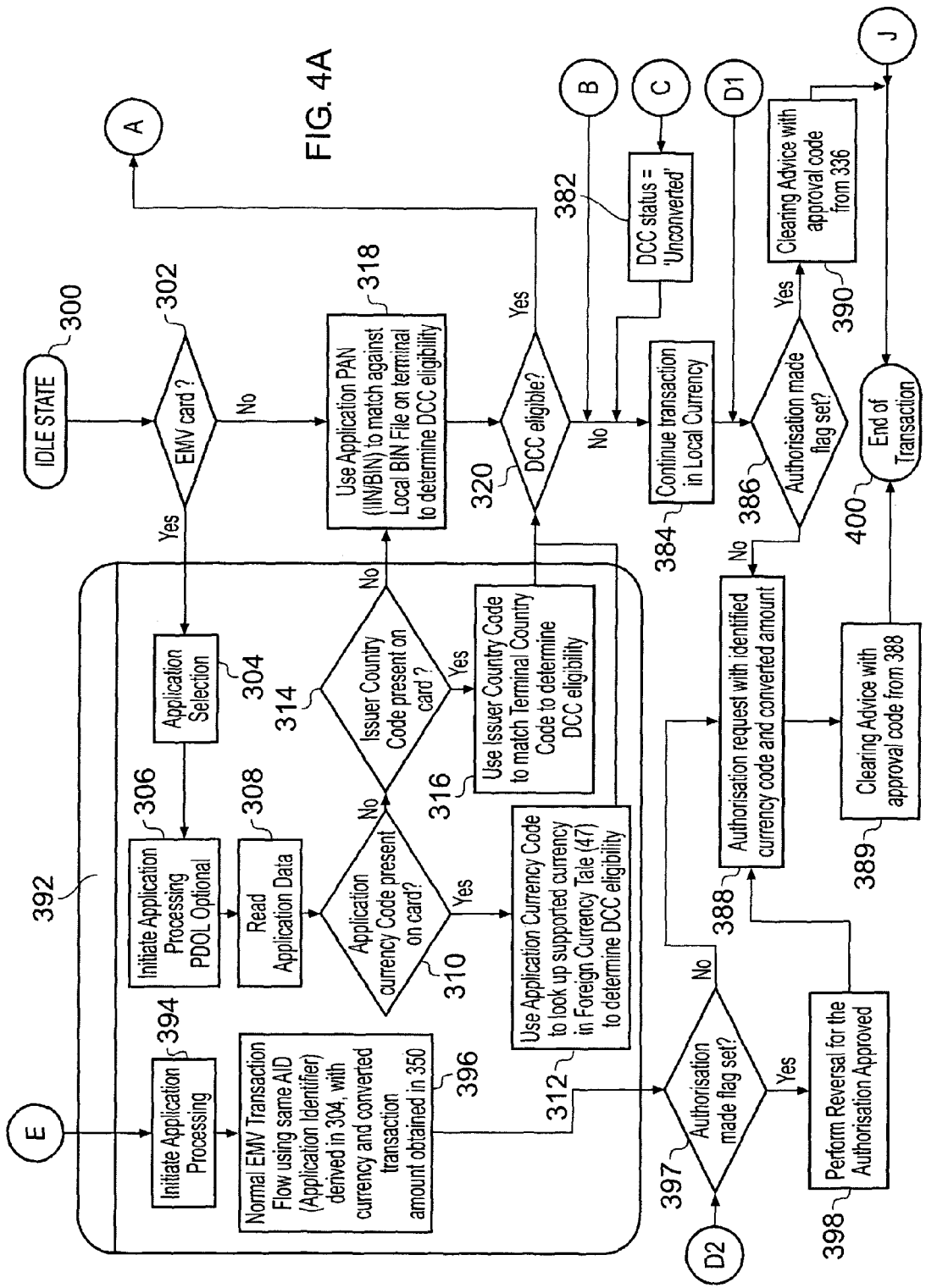
FIGS. 4A, 4B and 4C form a flow diagram illustrating an example operation of a transaction terminal system.
Figure 4B:
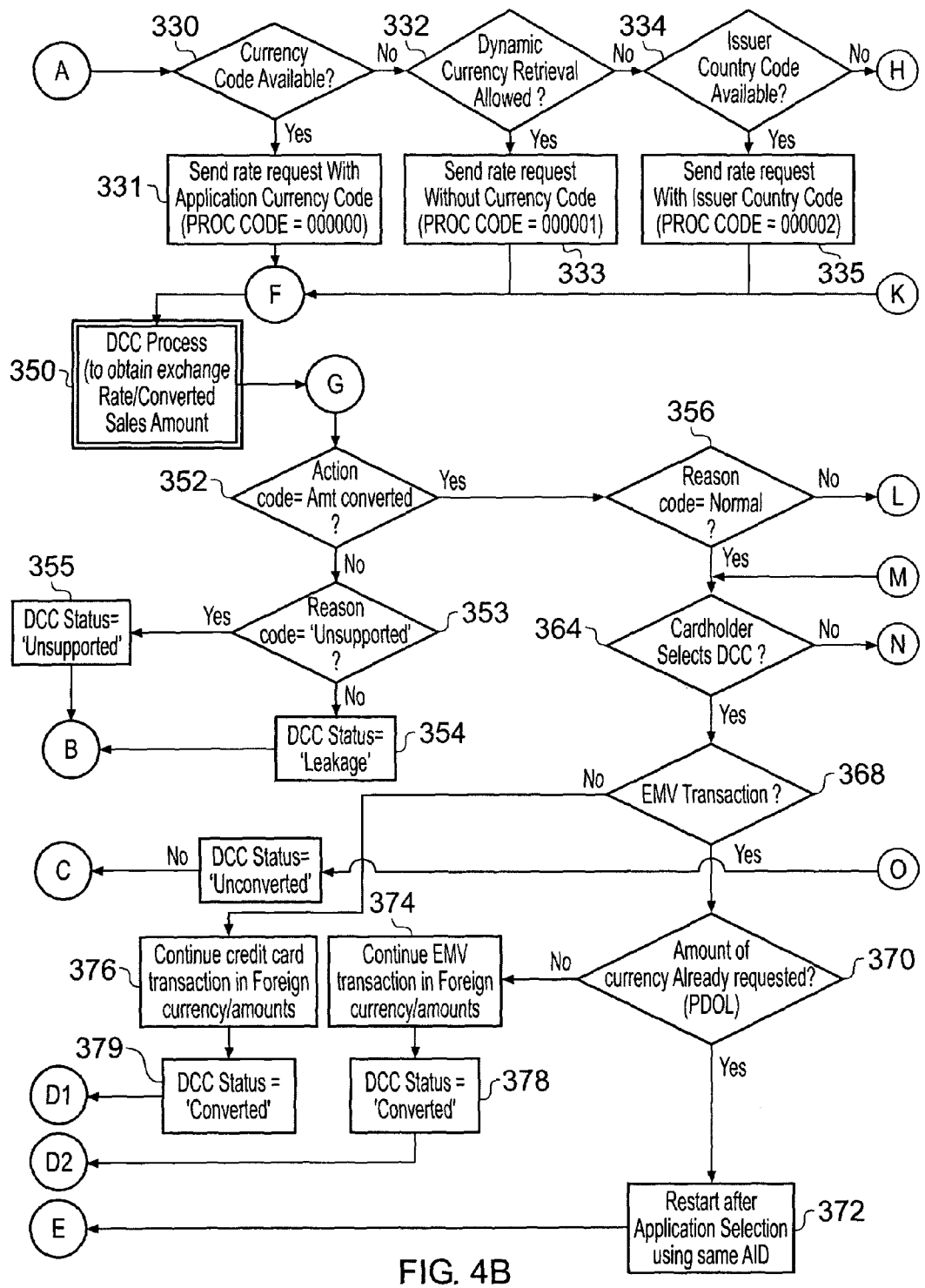

FIG. 4, formed from FIGS. 4A, 4B and, 4C, is a process diagram illustrating card transaction (e.g., a payment card transaction) and DCC operations for a payment card transaction performed by a transaction terminal system 10.

The transaction terminal system 10 is initially in an idle state 300. When a user (e.g., a card holder) wishes to conduct a transaction (for example to make a payment) the transaction terminal determines the type of payment card. If it is determined in step 302 that the payment card is an EMV card (i.e., a card with a chip), then EMV processing is performed at 392 by the transaction terminal 10 in combination with the EMV card.

At 304, the application selection takes place. In other words, the transaction terminal system 10 can be operative at 304 to determine the applications that are mutually supported by the terminal system 10 and the payment card, so as to allow the cardholder to select the preferred application (e.g., VISA Credit/Debit, Electron, MasterCard Credit/Debit or others) to be used.

At 306, the selected payment card application can be initiated, optionally using a Processing options Data Object List (PDOL) if provided on the payment card.

The initiate application processing function 306 can:
inform the payment card chip that processing of a new transaction is beginning;
provide the payment card chip terminal-related information about the transaction;
obtain from the payment card chip an application interchange profile and a list of files that contain payment card chip data to be used in processing the transaction; and
determine whether the transaction is allowed.

The PDOL, if present on the payment card, is a list of tags and lengths of terminal-resident data elements for the payment card chip. If a PDOL is available, then the chip card will request the transaction terminal system 10 to use the information available in the PDOL for the applicable application. If present in the PDOL, the chip card may request a transaction amount and a currency from the transaction terminal system 10.

At 308, data is then read from the payment card. Data contained in the payment card chip can be used by the transaction terminal system 10 to perform various tasks.

The transaction terminal system 10 determines at 310 whether the application currency code is present on the card. If an application currency code representative of the currency in which the payment card's account is managed is present on the card, then at step 312 the application currency code is compared to entries in the foreign currency table 47 in storage 42 in the transaction terminal system 10 to determine DCC eligibility. If the application currency code corresponds to a foreign currency supported for dynamic currency conversion for the transaction terminal system 10, then this is indicative that the user is eligible for dynamic currency conversion.

If, at 310, the transaction terminal system 10 determines that application currency code was not present on the card, then at 314, the transaction terminal system 10 determines whether an issuer country code representative of an issuer country is present on the payment card. If the issuer country code is present on the payment card, then at step 316 the transaction terminal system 10 compares the issuer country code to the reference code 48 held in storage 42 in the transaction terminal system 10 to determine DCC eligibility. If an issuer country code retrieved from the payment card corresponds to the reference code 48, then this is indicative that, the user is not eligible for dynamic currency conversion.

It will be appreciated that the order of the determinations at 310 and 314 could be reversed in another example.

If, at 302, the transaction terminal system 10 determines that the card is not a EMV card, or alternatively if the payment card is an EMV card and neither an application currency code nor an issuer country code are provided on the card (see 310 and 314), then at 318 the Primary Account Number (PAN) of the payment card can be used to determine DCC eligibility. For example, the transaction terminal system 10 could retrieve the Issuer Identification Number/Bank Identifier Number (IIN/BIN), which forms part of the PAN held on the magnetic strip or in the chip (if present) on the payment card, or entered manually by an user, and could compare this to a list 49 of local, or reference IIN/BIN codes for issuers local to the currency zone in which the transaction terminal system 10 is located and held for example in an IIN/BIN table in the local currency file 49 in storage 42 in the transaction terminal system 10. If this process is based on a retrieved IIN/BIN code that is found to correspond to one of a list of local, or reference IIN/BIN codes held in the local currency file 49 for issuers local to the currency zone in which the transaction terminal system 10 is located, then this is indicative that the user is not eligible for dynamic currency conversion.

Accordingly, at 320, the transaction terminal system 10 can make the determination as to whether the information identified at 312, 316 or 318 indicates that the user is potentially eligible for DCC.

If, at 320, the transaction terminal system 10 determines from the information identified at 312, 316 or 318 that the user is not eligible for DCC, then at 384, the transaction continues using the local (or reference) currency.

Figure 6:
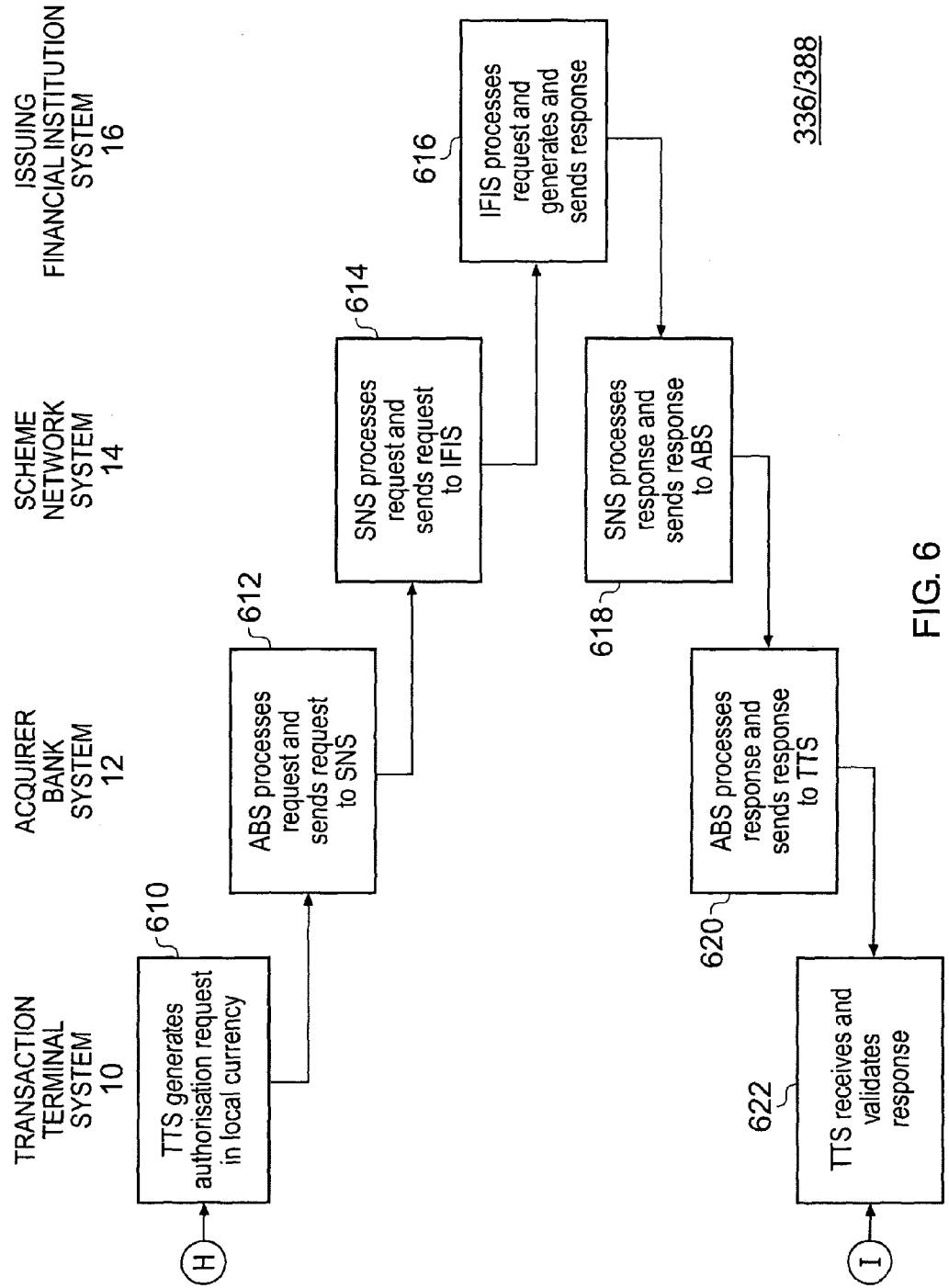
FIG. 6 forms a flow diagram illustrating an example of a payment authorisation process.

At step 386, the transaction terminal system 10 can make a check as to whether an authorisation has already been performed for the transaction, and if this is not so, then an authorisation request process described in FIG. 6 can be performed at 388. Authorisation may not be required for example, if the amount of the transaction is below a predetermined value, or if an "authorisation made" flag is set (see later). The transaction terminal system 10 then continues the transaction as per a normal payment transaction process at 389 by creating a clearing advice message using the local currency with the approval code obtained from 388. Alternatively, if it is determined at 386 that the "authorisation made" flag is set, the transaction terminal system 10 then continues the transaction at 390 without authorisation and creates a clearing advice message using the local currency. Note that the clearing messages are usually gathered into a batch at transaction terminal system 10, and being sent to acquirer bank system 12 as part of end of day processing; or being sent as a series of clearing advices before end of day. The process then completes at 400. For example, the transaction can be completed using that currency after receiving the authorization approval and having the receipt printed for cardholder to sign off.

If, however, at 320, it is determined that the user is eligible for DCC, then control passes via route A to FIG. 4B.

Accordingly, in FIG. 4B, the transaction terminal system 10 can make a determination at 330 whether an application currency code is available. If, at 330, it is determined that an application currency code is available, then at 331, a rate request message with the application currency code is transmitted to the DCC host system 18 using a first process code (e.g., PROC CODE=000000) as indicated at F.

Alternatively, if the transaction terminal system 10 determines at 330 that the application currency code is not available, then the transaction terminal system 10 can make a determination at 332 as to whether remote dynamic currency code retrieval is permitted for the transaction terminal system 10. Whether remote dynamic currency code retrieval is permitted, or not, can depend, for example, on the location of a transaction terminal and/or a DCC host system, and whether this functionality is enabled, or not. For example, in one embodiment, this functionality can be provided in that an appropriate functional module can be present, but this module can be deactivated prior to installation in an operator location. If it is determined that dynamic currency code retrieval is permitted (i.e., this functionality is enabled), then at 333, a rate request message with selected digits of PAN (e.g., first 8- or 10-digits of the PAN) without a currency code is transmitted to a DCC host system 18 using a second process code (e.g., PROC CODE=000001) as represented at F.

Alternatively, if at 332, it is determined that dynamic currency code retrieval is not permitted in the present transaction terminal system 10, then the transaction terminal system 10 can make a determination at 334 as to whether an issuer country code is available. If at 334, it is determined that an issuer country code is available, then at 335 a rate request message with the issuer country code is transmitted to the DCC host system 18 using a third process code (e.g., PROC CODE=000002) as indicated at F.

Alternatively, if at 334, it is determined that the issuer country code is not available, then the process passes at H to FIG. 4C and the transaction terminal system 10 causes an authorisation request to be made at 336 for the transaction as described with reference to FIG. 6 and an "authorisation made" flag is set to indicate that authorization request has been sent.

If following the authorisation request, an authorization response message is received at the transaction terminal system 10 at I, at 337 the transaction terminal system 10 determines whether the authorization response message provides approval for the transactions. If it is determined at 337 that approval is given; and it is further determined at 338 that the authorisation response message received includes a cardholder billing currency code, then at 339 a rate request message with the cardholder billing currency code is transmitted to the DCC host system using a fourth process code (e.g., PROC CODE=000003) as indicated at F in FIG. 4B (via K).

Alternatively, if at 337, it is determined that an authorization response message is received with rejection at the transaction terminal system 10, then the process returns at J to FIG. 4A to continue. The transaction is then terminated at 400 as the authorization request for the transaction has been rejected by the issuing financial institution system 16.

Alternatively, if at 338, the transaction terminal system 10 determines that an authorisation response message is received at the transaction terminal system 10 that does not includes a cardholder billing currency code, then the transaction terminal system 10 can offer a DCC supported currency list to the user (e.g., a payment card holder) at 340 for the user to make a selection of a non-local currency (hereinafter referred to as a "foreign currency"). The list of supported foreign currencies can be held in storage in the transaction terminal system 10. If it is determined at 341 that a foreign currency has been selected by a user, then at 342 a rate request message with a selected foreign currency code is transmitted to a DCC host system 18 using a fifth process code (e.g., PROC CODE=000004) as indicated at F in FIG. 4B (via K).

If, at 341, it is determined that no foreign currency has been selected, then control passes via O and C (FIG. 4B) to FIG. 4A and it is determined at 382 that the DCC status is "unconverted". At step 384, the transaction terminal system 10 then continues the transaction in the local (or reference) currency. At step 386, the transaction terminal system 10 can check whether the "authorisation made" flag is set, and if not, then an authorisation process described in FIG. 6 can be performed at 388. Following the process from 341, the "authorisation made" flag would be set at 336, so in this case the transaction terminal system 10 then continues the transaction as per a normal payment transaction process at 390 by creating a clearing advice message using the local currency with the approval code obtained from 336. Note that the clearing messages are usually gathered into a batch at transaction terminal system 10, and being sent to acquirer bank system 12 as part of end of day processing; or being sent as a series of clearing advices before end of day. The process then completes at 400. For example, the transaction can be completed using that currency after receiving the authorization approval and having the receipt printed for cardholder to sign off.

Returning to steps 331, 333, 335, 339 and 342, in each case, the rate request message is sent to the DCC host system 18 with an appropriate process code. It should be noted that the process codes 000000, 000001, 000002, 000003 or 000004, are shown by way of example only, and that other values can be provided for the process codes or other indication codes in other examples. For example, as the authorisation response message received at 336 may contain information other than a cardholder billing currency code from which the home billing currency code may be determined, one or more additional steps can then be included in the process following step 338 to detect the presence of such information and to send an appropriate rate request message with an appropriate process code to the DCC host system 18. By way of example only, if the rate response message included information in the form of an issuer country code, then a rate request message with an appropriate process code and the issuer country code could be generated based on that information. Also, it should be noted that the order of the steps 330/331, 332/333, 334/335, 336/337, 338/339 and 340/341/342 are shown in this order by way of illustration only, and that in other examples the steps could be performed in another order or in parallel.

At 350, a process is performed at the DCC host system 18 to obtain an exchange rate and a converted sales amount. FIG. 5 provides an illustrative example of this process 350 as performed at the DCC host system 18.

Figure 5A:
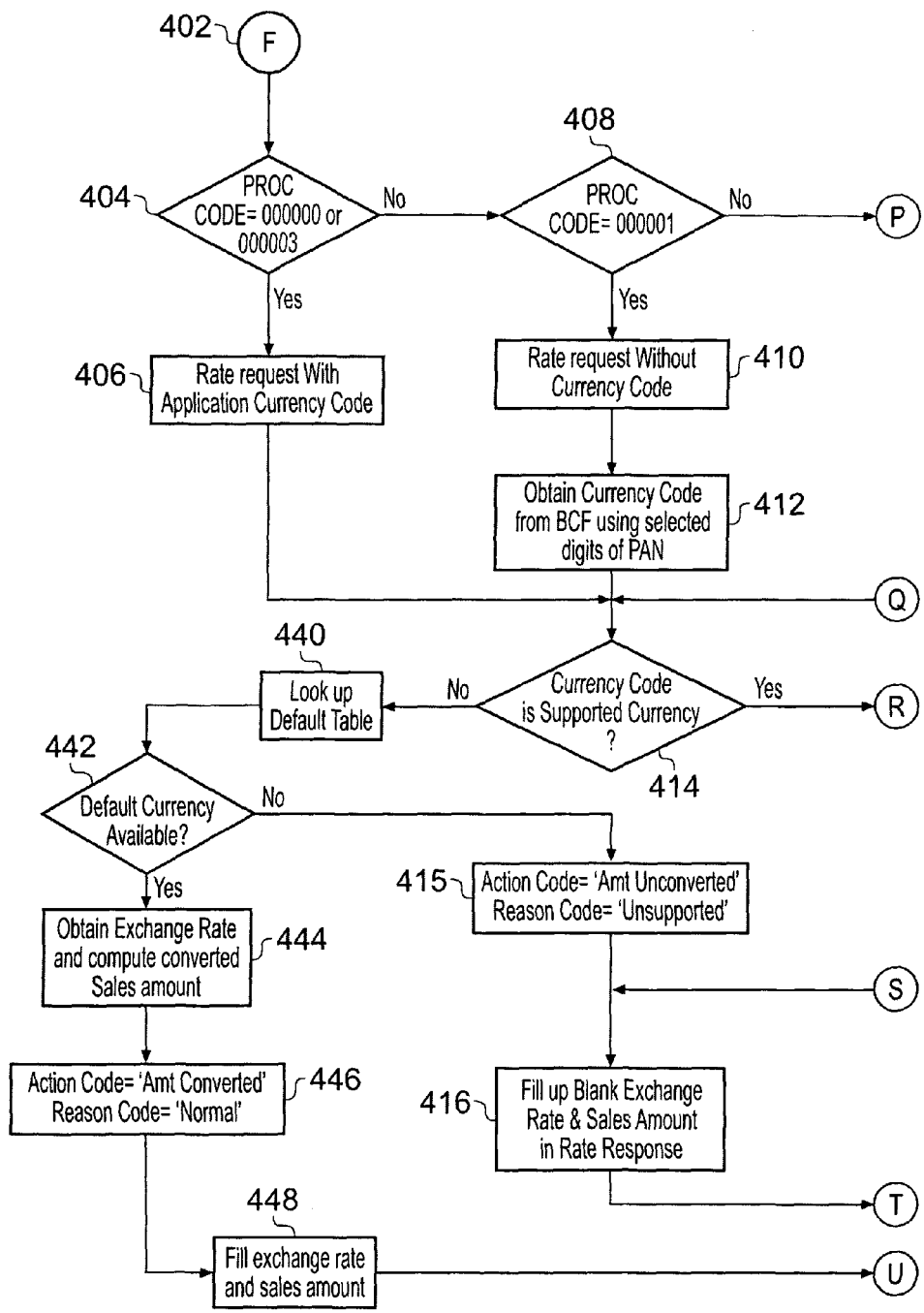
FIGS. 5A and 5B form a flow diagram illustrating an example operation of a dynamic currency conversion host system.
Figure 5B:
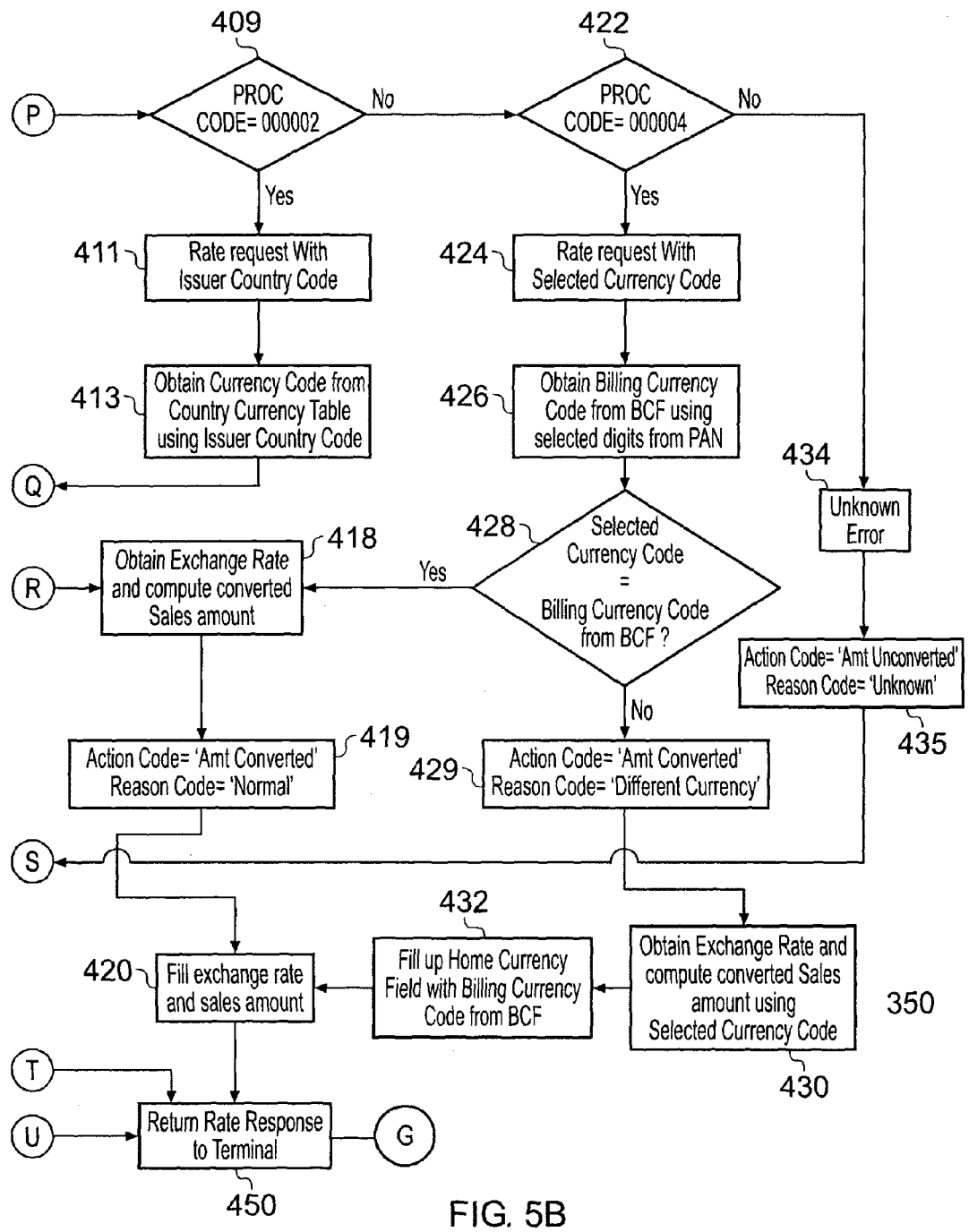

Turning to FIG. 5, which is formed from FIGS. 5A and 5B the process 350 starts where the rate request message is received at the DCC host system 18 at 402 from the transaction terminal system 10.

If, at 404, the DCC host system 18 determines that the process code is the first process code or the fourth process code (e.g., 000000 or 000003, respectively), then at 406, the rate request with the application currency code or the cardholder billing currency code is passed for processing.

Alternatively, if the DCC host system 18 determines at 404 that the process code is not the first or the fourth process code (e.g., not 000000 or 000003), then at 408 the DCC host system 18 determines whether the process code is the second process code (e.g., 000001). If the DCC host system 18 determines at 408 that the process code is the second process code (e.g., 000001), then at 410 the DCC host system 18 determines that the rate request message with selected digits of PAN without a currency code is passed for processing, and at 412 the DCC host system 18 obtains the currency code from a home currency file (e.g., a billing currency file or (BCF)) 75 held in storage 72 in the DCC host system 18. In one example, a home currency file lookup can be made using, for example, selected digits (e.g., from the first eight digits) of the PAN. The DCC host system 18 then passes this for further processing.

Alternatively, the DCC host system 18 determines at 408 that the process code is not the second process code (e.g., not 000001), then the process passes via P to 409 and the DCC host system 18 determines whether the process code is the third process code (e.g., 000002). If the DCC host system 18 determines at 409 that the process code is the third process code (e.g., 000002), then at 411 the DCC host system 18 determines that the rate request message with an issuer country code is passed for processing, and in 413 the DCC host system 18 determines the currency code from the country to currency table 77 held in storage 72 in the DCC host system 18. A country to currency lookup can be made using for example, the supplied issuer country code, to obtain the default official national currency code for the corresponding supplied country code.

Following 406, 412 or 413 (via Q), at 414 the DCC host system 18 determines whether the currency code is a supported currency by comparing the identified currency code to a list of DCC supported currencies held in storage 72 in the DCC host system 18.

If the DCC host system 18 determines at 414 that the identified currency code is not a DCC supported currency, then at 440 the DCC host system 18 makes a look up in a default currency table 73 to identify if a default DCC supported currency is held for this identified non-supported currency code. At 442, the DCC host system 18 determines whether a default DCC supported currency is identified. If not, then at 415, the DCC host system 18 sets parameters for a rate response message [Action Code="AmtUnconverted" (amount unconverted) and Reason Code "Unsupported"] and a rate response message is created at 416 in which includes blank exchange rate and sales amount fields. The process passes via T to 450 (FIG. 5B), where the DCC host system 18 returns the rate response message to the transaction terminal system 10 as indicated at G.

Alternatively, if at 442, the DCC host system 18 determines that a default DCC supported currency is identified, then at 444, the DCC host system 18 obtains the currency conversion (exchange) rate for the default currency concerned from the currency conversion rate tables 74 in the DCC host system 18 and converts the transaction amount using the obtained currency conversion rate. At 446, the DCC host system 18 sets parameters for a rate response message [Action Code="AmtConverted" (amount converted) and Reason Code "Normal"] and creates a rate response message at 448 with the obtained exchange rates and converted transaction amounts. The process passes via U to 450, where the DCC host system 18 returns the rate response message including with obtained exchange rates and converted transaction amounts fields to the transaction terminal system 10 as indicated at G.

If at 414, the DCC host system 18 determines that the identified currency code is DCC supported, then the process passes via R to 418 (FIG. 5B), where the DCC host system 18 obtains the currency conversion (exchange) rate for the currency concerned from the currency conversion rate tables 74 in the DCC host system 18 and converts the transaction amount using the currency conversion rate. At 419, the DCC host system 18 sets parameters for a rate response message [Action Code="AmtConverted" (amount converted) and Reason Code "Normal"] and creates a rate response message at 420 with the obtained exchange rates and converted transaction amounts. At 450, the DCC host system 18 returns the rate response message including obtained exchange rates and converted transaction amounts fields to the transaction terminal system 10 as indicated at G.

Returning to 409, if the DCC host system 18 determines that the processor code is not the third process code (e.g., is not 000002), then at 422, the DCC host system 18 determines whether the process code is the fifth process code (e.g., 000004).

If the DCC host system 18 determines at 422 that the process code is the fifth process code (e.g., 000004), then at 424, the DCC host system 18 recognises that the received rate request is a rate request with a user selected currency. At 426, the DCC host system 18 obtains a billing currency code associated with the payment card from the home currency file (e.g., a billing currency file BCF) 75 held in storage 72 in the DCC host system 18 using selected digits of the PAN, for example, the first eight digits of the PAN. At 428, the DCC host system 18 determines whether the user selected currency code is the same as the billing currency code obtained from the home currency file (e.g., a BCF) 75.

If the DCC host system 18 determines at 428 that the user selected currency code is the same as the billing currency code identified in the home currency file (e.g., a BCF) 75, then at 418, the DCC host system 18 obtains the exchange rate applicable for the user selected currency from the currency conversion rate table 74 and the converted transaction amount is calculated. At 419, the DCC host system 18 sets parameters for a rate response message [Action Code="AmtConverted" (amount converted) and Reason Code "Normal"] and creates a rate response message at 420 with the obtained exchange rate and converted transaction amount. At 450, the DCC host system 18 returns the rate response message including the obtained exchange rate and converted transaction amount fields to the transaction terminal system 10 as indicated at G.

Returning to 428, if the DCC host system 18 determines that the selected currency code is not equal to the billing currency code identified from the home currency file (e.g., a BCF) 75, then at 429, the DCC host system 18 sets parameters for a rate response message [Action Code="AmtConverted" (amount converted) and Reason Code "Different Currency"]. At 430, the DCC host system 18 obtains the exchange rate applicable for the user selected currency from the currency conversion rate table 74 and the converted transaction amount is calculated. At 432, the DCC host system 18 populates the home currency field in the rate response message with the billing currency code identified from the home currency file (e.g., a BCF) 75. The DCC host system 18 then creates a rate response message at 420 with the obtained exchange rate and converted transaction amount. At 450, the DCC host system 18 returns the rate response message including the populated home currency, identified currency, conversion rate and converted transaction amount fields to the transaction terminal system 10 as indicated at G.

Returning to 422, if the DCC host system 18 determines that the process code is not the fifth process code (e.g., 000004), then at 434 the DCC host system 18 determines that there is an unknown error, and at 435 the DCC host system 18 sets parameters for a rate response message [Action Code="AmtUnconverted" (amount unconverted) and Reason Code "Unknown"]. The process passes via S to 416 (FIG. 5A), where the DCC host system 18 creates a rate response message which includes blank exchange rate and sales amount fields. The process passes via T to 450 (FIG. 5B), where the DCC host system 18 returns the rate response message to the transaction terminal system 10 as indicated at G.

It will be appreciated that the order of the steps 404, 408, 409 and 422 is shown by way of illustration only, and that in another example these steps could be effected in another order or in parallel. Also, if as discussed with respect to FIGS. 4B and 4C, additional rate request type messages with different process codes are generated, for example based on information contained in an authorisation response message, then appropriate processing steps can be included in the process 350 performed a the DCC host system 18.

Following the process 350 described with reference to FIG. 5, the process returns at G to the transaction terminal system 10 and continues in FIG. 4B at 352, where the transaction terminal system 10 determines whether, or not, the action code in the rate response message shows that the amount has been converted (Action Code="AmtConverted").

If the Action Code does not show that the amount is converted (Action Code="AmtUnconverted"), then at 353, the transaction terminal system 10 determines the reason. If the Reason Code in the rate response message is set to "Unsupported", then at 355, the transaction terminal system 10 sets the DCC status to "Unsupported", and then the process returns via B to FIG. 4A, where the transaction terminal system 10 processes the transaction at 384 in the local, or reference, currency. As described above, the transaction terminal system 10 makes a check at 386 in FIG. 4A as to whether an authorisation is needed for the transaction, and if so, then an authorisation process described in FIG. 6 can be performed at 388. An authorisation request may not be required for example, if the amount of the transaction is below a predetermined value, or if the "authorisation made" flag is set. The transaction terminal system 10 then continues the transaction as per a normal payment transaction process at 389 by creating a clearing advice message using the local currency with the approval code obtained from 388. Alternatively, if it is determined at 386 that the "authorisation made" flag is set, the transaction terminal system 10 then continues the transaction at 390 without authorisation and creates a clearing advice message using the local currency with the approval code obtained previously at 336. Note that the clearing messages are usually gathered into a batch at transaction terminal system 10, and being sent to acquirer bank system 12 as part of end of day processing; or being sent as a series of clearing advices before end of day. The process then completes at 400. For example, the transaction can be completed using that currency after receiving the authorization approval and having the receipt printed for cardholder to sign off.

If at 353, the transaction terminal system 10 determines that the Reason Code in the rate response message is not set to "Unsupported", then at 354 the transaction terminal system 10 sets the DCC status to "Leakage". The process then returns via B to FIG. 4A, the transaction terminal system 10 proceeds to process the transaction at 384 in the local, or reference, currency. As described above, the transaction terminal system 10 makes a check at 386 in FIG. 4A as to whether an authorisation is needed for the transaction, and if so, then an authorisation process described in FIG. 6 can be performed at 388. An authorisation request may not be required for example, if the amount of the transaction is below a predetermined value, or if the "authorisation made" flag is set. The transaction terminal system 10 then continues the transaction as per a normal payment transaction process at 389 by creating a clearing advice message using the local currency with the approval code obtained from 388. Alternatively, if it is determined at 386 that the "authorisation made" flag is set, the transaction terminal system 10 then continues the transaction at 390 without authorisation and creates a clearing advice message using the local currency with the approval code obtained previously at 336. Note that the clearing messages are usually gathered into a batch at transaction terminal system 10, and being sent to acquirer bank system 12 as part of end of day processing; or being sent as a series of clearing advices before end of day. The process then completes at 400. For example, the transaction can be completed using that currency after receiving the authorization approval and having the receipt printed for cardholder to sign off.

Alternatively, if at 352, the transaction terminal system 10 determines that the Action Code in the response message shows that the amount has been converted (Action Code="AmtConverted"), then at 356 the transaction terminal system 10 determines whether the Reason Code in the message is set to "Normal".

If at 356, the transaction terminal system 10 determines that the Reason Code is set to "Normal", then at 364 the card holder is given the option to confirm his/her selection of a DCC transaction. If the card holder does select DCC at 364, then at 368 the transaction terminal system 10 determines whether the transaction is a chip card (EMV) transaction. If the transaction is determined at 368 to be a chip card transaction, then at 370, the transaction terminal system 10 determines whether the transaction amount or currency has already been requested in the Initiate Application Processing stage with PDOL option. If at 370, it is determined that a transaction amount or currency has already been requested, then at 372 the transaction terminal system 10 restarts the process via E by initiating application processing at 394 in FIG. 4A and providing a normal EMV transaction flow at 396 in FIG. 4A using the same Application Identifier AID derived at 304 with the converted transaction amount and the currency code confirmed in the DCC process at 350. The transaction will then continue at 397 to determine if an authorisation has been performed before. Alternatively, if at 370, the transaction terminal system 10 determines that a transaction amount or currency has not been requested already at Initiate Application Processing stage with PDOL option, then at 374, the transaction terminal system 10 continues the chip card transaction in the card holder confirmed foreign currency code with the converted transaction amounts in foreign currency confirmed in the DCC process at 350. Following 374, at 378 the DCC status is noted as "Converted" and the process returns at D2 to FIG. 4A to continue. Following 396 or 378, the transaction terminal system 10 checks at 397 in FIG. 4A as to whether an authorisation has already been performed for the transaction, and if so, then a reversal for that authorisation is performed at 398. Following 398, an authorisation request process described in FIG. 6 can then be performed at 388 with the converted currency code and converted sales amount. On the other hand, if it is determined at 397 that the authorisation has not been performed for the transaction, an authorisation request process described in FIG. 6 can then be performed at 388 with the converted currency code and converted sales amount without performing any reversal. After the authorisation is performed at 388, the transaction terminal system 10 then continues the transaction as per a normal payment transaction process at 389 by creating a clearing advice message using the converted currency with the approval code obtained from 388. Note that the clearing messages are usually gathered into a batch at transaction terminal system 10, and being sent to acquirer bank system 12 as part of end of day processing; or being sent as a series of clearing advices before end of day. The process then completes at 400. For example, the transaction can be completed using that currency after receiving the authorization approval and having the receipt printed for cardholder to sign off.

If the transaction terminal system 10 determines at 368 that the payment card transaction is not a chip card transaction, then at 376 the transaction terminal system 10 continues the payment card transaction in the card holder confirmed foreign currency using the converted transaction amounts in that foreign currency.

Following 376, at 379 the DCC status is noted as "Converted" and the process returns at D1 to FIG. 4A to continue. As described above, the transaction terminal system 10 checks at 386 in FIG. 4A as to whether an authorisation is needed for the transaction, and if so, then an authorisation request process described in FIG. 6 can be performed at 388. Authorisation may not be required for example, if the amount of the transaction is below a predetermined value, or if the "authorisation made" flag is set. If authorisation is performed at 388, the transaction terminal system 10 then continues the transaction as per a normal payment transaction process at 389 by creating a clearing advice message using the converted currency with the approval code obtained from 388. Alternatively, if it is determined at 386 that the "authorisation made" flag is set, the transaction terminal system 10 then continues the transaction at 390 without authorisation and creates a clearing advice message using the converted currency with the approval code obtained previously at 336. Note that the clearing messages are usually gathered into a batch at transaction terminal system 10, and being sent to acquirer bank system 12 as part of end of day processing; or being sent as a series of clearing advices before end of day. The process then completes at 400. For example, the transaction can be completed using that currency after receiving the authorization approval and having the receipt printed for cardholder to sign off.

Returning to 364, if at 364 the user does not select DCC, then the process returns via N and O to C to FIG. 4A and at 382 the DCC status is noted as "Unconverted" and the transaction terminal system 10 continues the transaction at 384 in the local (reference) currency. As described above, the transaction terminal system 10 checks at 386 in FIG. 4A as to whether an authorisation request is needed for the transaction, and if so, then an authorisation process described in FIG. 6 can be performed at 388. Authorisation may not be required for example, if the amount of the transaction is below a predetermined value, or if the "authorisation made" flag is set. The transaction terminal system 10 then continues the transaction as per a normal payment transaction process at 389 by creating a clearing advice message using the local currency with the approval code obtained from 388. Alternatively, if it is determined at 386 that the "authorisation made" flag is set, the transaction terminal system 10 then continues the transaction at 390 without authorisation and creates a clearing advice message using the local currency with the approval code obtained previously at 336. Note that the clearing messages are usually gathered into a batch at transaction terminal system 10, and being sent to acquirer bank system 12 as part of end of day processing; or being sent as a series of clearing advices before end of day. The process then completes at 400. For example, the transaction can be completed using that currency after receiving the authorization approval and having the receipt printed for cardholder to sign off.

Returning to 356, if at 356 it is determined that the Reason Code is not set to "Normal", then the process will go to 358 via L, the transaction terminal system 10 displays an alert message 360 to the user. The alert message 360 could, for example, be "A transaction currency (xxx) other then your card's billing currency is chosen, do you wish to proceed? (Y/N)".

If, at 362, on the basis of the alert message 360 displayed at 358, the user chooses to continue with the selected currency, then the process passes to 364 (FIG. 4B) via M as described earlier. Alternatively, if at 362 it is determined that the user chooses not to continue with the selected currency, then the process returns via O and C to FIG. 4A and at 382 the DCC status is noted as "unconverted" and continues in the local currency. As described above, the transaction terminal system 10 makes a check at 386 in FIG. 4A as to whether an authorisation is needed for the transaction, and if so, then an authorisation process described in FIG. 6 can be performed at 388. Authorisation may not be required for example, if the amount of the transaction is below a predetermined value, or if the "authorisation made" flag is set. The transaction terminal system 10 then continues the transaction as per a normal payment transaction process at 389 by creating a clearing advice message using the local currency with the approval code obtained from 388. Alternatively, if it is determined at 386 that the "authorisation made" flag is set, the transaction terminal system 10 then continues the transaction at 390 without authorisation and creates a clearing advice message using the local currency with the approval code obtained previously at 336. Note that the clearing messages are usually gathered into a batch at transaction terminal system 10, and being sent to acquirer bank system 12 as part of end of day processing; or being sent as a series of clearing advices before end of day. The process then completes at 400. For example, the transaction can be completed using that currency after receiving the authorization approval and having the receipt printed for cardholder to sign off.

FIG. 6 illustrates an example authorisation process as identified at 388/336 in FIGS. 4A/4C.

An example of an authorisation process as identified at 336 in FIG. 4C will be described first of all.

The processor 40 (FIG. 2) of the transaction terminal system 10, in response to the DCC module 46 (FIG. 2), can be operable to generate a payment authorisation request message 20 that is transmitted to the acquirer bank system 12 associated with the transaction terminal system 10 or a retailer operating the transaction terminal system 10. The payment authorisation request message 20 includes data that identifies the captured card data, the details of the transaction including the local currency of the transaction terminal system 10 and the transaction amount in that currency, and routing information identifying the transaction terminal system 10. The message 20 can be sent, for example, using a conventional message protocol, for example using a message packet-based protocol such as ISO8583.

The acquirer bank system 12 receives the payment authorisation request message 20 from the transaction terminal system 10 and analyses the payment authorisation request message 20 to determine an appropriate scheme network 14 for the card concerned. This can be determined by comparing the received payment card data to tables identifying scheme network codes in the received payment card details. The acquirer bank system then sends a payment authorisation request message 22 to the appropriate scheme network 14. The payment authorisation request message 22 can include the data of the payment authorisation request message 20, including the details of the transaction such as the local currency of the transaction terminal system 10 and the transaction amount in that currency, and additionally routing information identifying the acquirer bank system 12. The payment authorisation request message 22 can be sent, for example, using a conventional message protocol, such as VISA BASE I authorisation message using a message packet-based protocol.

The scheme network 14 receives the payment authorisation request message 22 from the acquirer bank system 12 and analyses the received payment authorisation request message 22 to identify the issuing financial institution that issued the payment card. This can be determined by comparing the received payment card data to tables identifying issuing financial institution codes in the received payment card details. In particular, for issuing financial institutions that subscribe to a multi currency service, the scheme network system 14 is operable to identify the home currency (or the billing currency) for the payment card concerned of the issuing financial institution system 16 (e.g., from the PAN), to identify an exchange rate between the local currency of the transaction terminal system 10 and home currency of the issuing financial institution system and to compute an equivalent amount in the home currency. The scheme network 14 is then operable to generate a payment authorisation request message 24 to be sent to the issuing financial institution system 16 that, in addition to some or all of the data of the payment authorisation request message 22 and additional routing information identifying the scheme network 14 also identifies the home currency of the issuing financial institution, the transaction amount converted in to the home currency by the scheme network system 14 and the exchange rate used by the scheme network system 14 in respective fields of the payment authorisation request message 24. For example, for a scheme network system operated by VISA, the home currency, the converted transaction amount and the exchange rate are contained in fields 51, 6 and 10, respectively of the payment authorisation request message 24. The scheme network 14 is then operable to forward the payment authorisation request message to the issuing financial institution system 16 concerned. The message 22 can be sent, for example, using a conventional message protocol, such as a message packet-based protocol.

The issuing financial institution system 16 receives the payment authorisation request message 24 and processes the authorisation request by comparing the details of the payment request to records held for the payment card concerned. The issuing financial institution system 16 maintains details of the payment card account, including details of the payment card holder, a card purchase record, a credit limit, whether the account is active or blocked, a billing currency, etc. The issuing financial institution system 16 is operable to use the payment card details to confirm that the payment card is active and not blocked, and then to check that the payment can be authorised in accordance with rules appropriate for the payment card account (for example based on the amount of the transaction verses a payment history and/or an available credit, etc.). If the transaction is to be authorised, then the issuing financial institution system 16 will reserve the amount in the home currency identified in the authorisation request message against the card account and will generate an appropriate positive authorisation response message 26 to be sent to the transaction terminal system 10 using the routing information contained in the received payment authorisation request message 24. If the payment is not authorised, or a referral check is required, then an appropriate negative response message is generated instead.

The authorisation response message 26 identifies the original payment authorisation request message 20 and includes the routing information from the payment authorisation request messages 20, 22 and 24. In some authorisation response messages 26, the issuing financial institution system will also include in the authorisation response message 26 the home currency, the converted transaction amount and the exchange rate received in the respective fields of the payment authorisation request message 24 (although in some cases these may be omitted).

The issuing financial institution system 16 returns the authorisation response message 26 to the scheme network 14 using the routing information from the payment authorisation request message 24.

The scheme network 14 receives the authorisation response message 26 and identifies routing information from the authorisation response message 24 for causing an authorisation response message 28 to be sent to the appropriate acquiring bank system 12. The authorisation response message 28 sent by the scheme network system 14 identifies the original payment authorisation request message 20 and includes routing information from the payment authorisation request messages 20 and 22. The authorisation response messages 28 can further identify the home currency, the converted transaction amount and the exchange rate of the respective fields of the payment authorisation request message 24, whether or not these were contained in the authorisation response message 26. In some cases, however, these fields may be omitted.

The acquirer bank system 12 receives the authorisation response message 28 and identifies routing information in the authorisation response message for sending an authorisation response message 30 to the transaction terminal system 10.

The authorisation request and response messages can include various fields. For example the authorisation request and/or response messages can include fields selected from, for example:

a message type identifier field defining a message type;
a processing code field defining a transaction type and an account type;
a transaction amount field specifying the transaction amount in the transaction terminal currency;
a transaction amount field specifying the transaction amount in an issuing institution currency;
an exchange rate field;
a transmission date and time field;
an expiration date field for the payment card;
a merchant category code field;
an acquiring institution country code field;
a POS entry mode code field;
a POS condition code field;
an acquiring institution identification field;
a retrieval reference number field;
an authorisation code or approval code field;
a response code field;
a card acceptor identification field;
a card acceptor name and location field;
a transaction currency code field;
a cardholder billing currency field;
an additional POS information field; and
a private field.

Figure 4C:
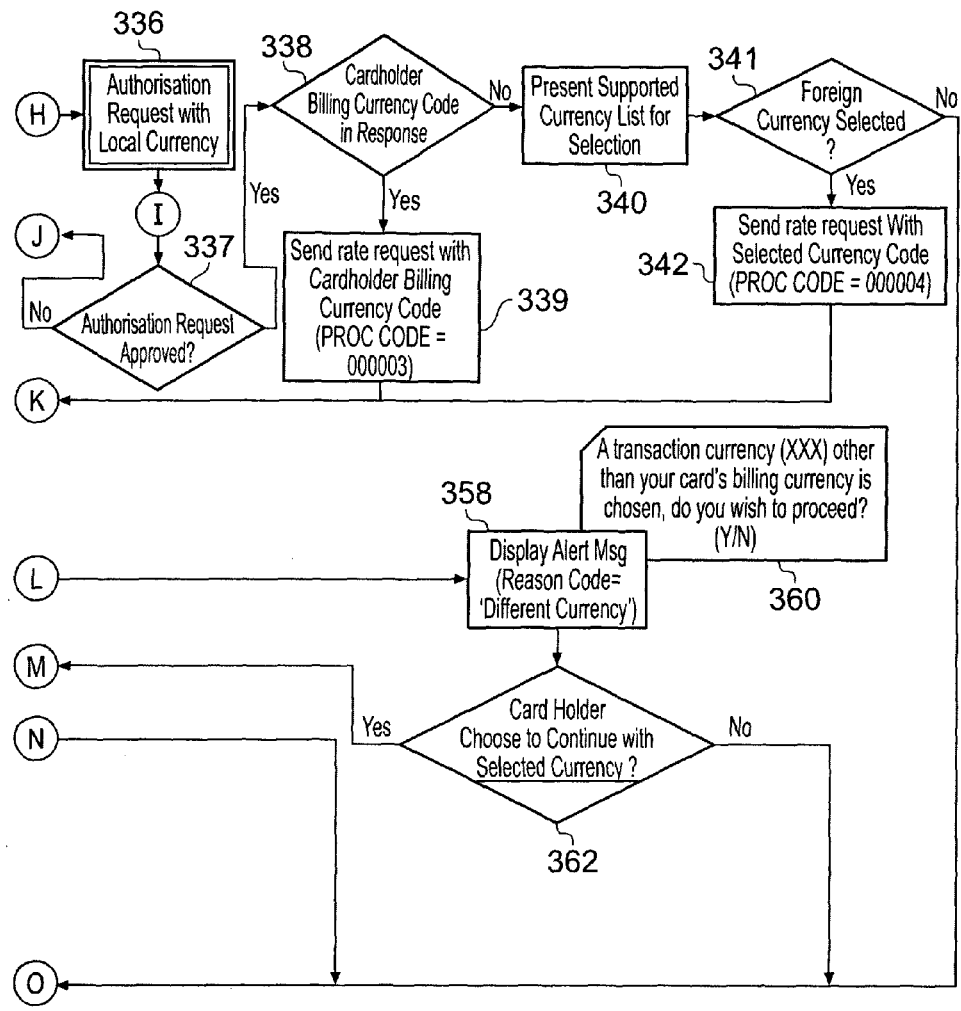

As indicated above, FIG. 6 illustrates an example of an authorisation process as identified at 388 and 336 in FIGS. 4A and 4C. The only difference between the authorisation processes for step 336 and 388 is that authorisation request messages 20 and 22 for step 336 will contain the transaction amount in the local currency of the transaction terminal system 10 and identify as the transaction currency the local currency of the transaction terminal system 10, whereas the authorisation request messages 20 and 22 for step 388 will contain the transaction amount in the currency selected for DCC and will indicate that currency.

Following the steps described above, the payment terminal can then be operable to require the user to confirm the selection, for example by printing a receipt for signature (or requesting entry of a PIN number). On confirmation of the chosen currency for the transaction, the transaction terminal system 10 is operable to transmit a clearing message (e.g., for the card holder's home or billing currency message) to the acquire bank system 12. (Rather than sending a clearing message immediately, this can be done as a batch process, for example at the end of the day). The acquirer bank system is then operable to return and acknowledgement to the transaction terminal system 10 that the clearing has been accepted and to forward the clearing message to the scheme network 14. The scheme network 14 is operable further for forward the clearing message to the issuing financial institutions system 16.

Returning to FIGS. 4A, 4B and 4C, the processes can be implemented using individual software modules that together form the CP module 44 and the DCC module 46 in the storage 42 of the transaction terminal system 10 to be processed by the processor(s) 40 of the transaction terminal system 10. Individual software program modules can be configured active or inactive as appropriate to adapt the transaction terminal to local requirements.

Similarly, the process of FIGS. 5A and 5B can be implemented using individual software modules that together form the DCC module 76 in the storage 72 of the DCC host system 18 to be processed by the processor(s) 70 of the DCC host system 18. Individual software program modules can be configured active or inactive as appropriate to adapt the transaction terminal to local requirements.

In the processes described with reference to FIGS. 4A, 4B and 4C, and FIGS. 5A and 5B, it will be noted that the transaction terminal system 10 includes a process code in a rate request message transmitted to the DCC host system 18, and the DCC host system 18 is responsive to the process code to control the processing of the rate response message and the transaction terminal system 10 is responsive to the Action Codes and Reason Codes to determine further processing. It will be appreciated, however, that in another example, the encoding of the rate request message could be effected other than by using process, action and reason codes, for example by using selective population of fields of the rate request message and the rate response message, where certain fields could be left blank or set to predetermined values. Where reference is made to a blank field this can include, for example, setting the content of a field to all zeros, or to some other values that do not correspond to a valid content for the field.

Also, as well as the specific field mentioned above, a rate request message and a rate response message can include other fields.

An example rate request message can include, for example, one or more fields selected from the following fields for:
 a process code;
 a date and time of transmission;
 a system trace audit number;
 a date and time of local transaction;
 a local currency merchant ID;
 a local currency TID;
 an acquirer ID;
 a base amount;
 a card BIN/IIN number;
 a rate request reference ID;
 a card type;
 a till ID/Merchant POS;
 a foreign currency code (e.g., a foreign currency alpha code).

An example rate response message can include, for example one or more fields selected from the following fields for:
 a process code;
 a date and time of transmission;
 a system trace audit number;
 a date and time of local transaction;
 a local currency merchant ID;
 a local currency TID;
 an acquirer ID;
 a base amount;
 a foreign amount;
 a card BIN/IIN number;
 an exchange rate;
 a rate request reference ID;
 a card type;
 an inverted rate;
 a foreign currency code, (for example a foreign currency alpha code);
 a home billing currency code (for example a home currency alpha code);
 a till ID/merchant POS;
 a markup percentage;
 a commission percentage;
 a commission value;
 an action code;
 a reason code.

Also, it should be mentioned that although reference is made to a rate request message and a rate response message, the message transfer could involve one or more rate request messages and one or more rate response messages.

The DCC program modules 46 and 76 may each be embodied in one or more computer program products for operating the processors 40 and 70, respectively. In other words, the processes and modules described with reference to FIGS. 4A, 4B and 4C can be implemented by one or more computer program products operable to control the processor(s) 40 of the transaction terminal system 10. Similarly, the processes and modules described with reference to FIGS. 5A and 5B can be implemented by one or more computer program products operable to control the processor(s) 70 of the DCC host system 18. Each computer program product may be in the form of one or more computer programs provided, for example on a carrier medium forming a computer readable medium. The carrier medium could be a storage medium such as a solid state, magnetic, optical, magneto-optical or other storage medium. The carrier medium could be a transmission medium such as broadcast, telephonic, computer network, wired, wireless, electrical, electromagnetic optical or any other transmission medium.

It should be noted that the term "payment card" as used herein is used in a generic manner to describe a token or device or carrier that can be used to effect a transaction based on an account associated therewith. It should be noted that the "payment card" does not need to take form of a conventional rectangular plastic credit card or the like, possible with an integrated chip integrated therein, but the "payment card", within the meaning applied herein, may take any other form that can be operable as a credit, debit, or other form of payment token, device or carrier. For example, within the meaning of the term "payment card" as used herein, a payment system could be based on, or permit the use of mobile telephones, personal data assistants (PDAs), or other carriers of information as the "payment card". In such a case the mobile telephone is typically provided with a chip or software having functionality equivalent to that of chip of an EMV card. Accordingly, where reference is herein to a payment card, it is to be understood that that the "payment card" can take any suitable form to be operable as a payment token, device or carrier that is configured to conduct transactions based on an account associated therewith, for example means of appropriate software and/or a mechanism for transferring information to and from a payment terminal system (for example via contacts or in a contactless manner).

Although the embodiments described above have been described in detail, numerous variations and modifications will become apparent to those skilled in the art once the above disclosure is fully appreciated. It is intended that the following claims be interpreted to include all such variations and modifications and their equivalents.

The invention claimed is:

1. A transaction terminal system comprising:
   one or more input peripheral devices configured to receive payment card details and transaction details;
   a hardware communications unit configured to connect to a remote host system, wherein the remote host system is configured to process a plurality of rate request message types;
   a processor; and
   memory having stored thereon instructions executable by the processor to perform operations comprising:
      causing a rate request message to be transmitted to the remote host system via the hardware communications unit, wherein the rate request message is usable by the remote host system to identify a currency conversion rate; and
      processing a response message received from the remote host system that includes the currency conversion rate;
   wherein the rate request message includes:
      a rate request message type indicator indicative of one of the plurality of rate request message types, and
      a currency conversion indicator in a currency conversion field; and
   wherein the rate request message type indicator is usable by the remote host system to interpret the currency conversion indicator in order to identify the currency conversion rate.

2. The system of claim 1, wherein the instructions are executable to store at least one of a reference country indicator or a reference currency indicator for the transaction terminal system, the transaction terminal system being operable to identify whether received payment card details are indicative of a payment card for which an issuer country or billing currency is the reference country or currency and, in the event that an indicated payment card issuer country or billing currency is the reference country or currency, to process a transaction in a currency corresponding to a currency for the reference country or to the reference currency without transmitting a rate request message.

3. The system of claim 1, wherein the instructions are executable to store a reference currency indicator for the transaction terminal system, the transaction terminal system being operable to identify whether received payment card details are indicative of a payment card for which a billing currency is the reference currency and, in the event that an indicated payment card billing currency is the reference currency, to process a transaction in the reference currency without transmitting a rate request message.

4. The system of claim 3, wherein the instructions are further executable to store indications of reference payment card issuers for which a billing currency is the reference currency, the transaction terminal system being operable to compare payment card issuer information in the received payment card details to the reference payment card issuer indications to determine whether the received payment card details are indicative of a payment card for which a billing currency is the reference currency.

5. The system of claim 1, wherein the instructions are executable to store a reference country indicator for the transaction terminal system, the transaction terminal system being operable to identify whether received payment card details are indicative of a payment card for which an issuer country is a reference country and, in the event that an indicated payment card issuer country is the reference country, to process a transaction in a currency corresponding to a currency for the reference country without transmitting a rate request message.

6. The system of claim 5, wherein the instructions are further executable to store indications of reference payment card issuers for which an issuer country is the reference country, the transaction terminal system being operable to compare payment card issuer information in the received payment card details to the reference payment card issuer indications to determine whether the received payment card details are indicative of a payment card for which an issuer country is the reference country.

7. The system of claim 1, wherein:
   the transaction terminal system is operable to transmit an authorization request message including information indicative of the received payment card details and transaction details to a remote host system, and to receive an authorization response message containing information indicative of a billing currency for the payment card,
   the transaction terminal system being further operable to transmit the rate request message to the remote host system for a currency conversion rate for the billing currency, the rate request message further including a billing currency indicator in the currency conversion field and the rate request message type indicator indicative that the currency conversion field contains a billing currency indicator.

8. The system of claim 1, wherein the one or more input peripheral devices comprise a chip card reader, wherein the instructions are executable to respond to insertion of a payment card having a logic chip to attempt to retrieve billing currency information stored on the payment card; wherein the currency conversion indicator is representative of a billing currency retrieved or derived from information retrieved from the payment card.

9. The system of claim 1, wherein the instructions are executable to transmit a rate request message that includes a second rate request message type indicator and does not include a currency conversion indicator within a currency conversion field.

10. The system of claim 1, wherein the one or more input peripheral devices comprise a chip card reader, wherein the instructions are executable to respond to insertion of a payment card having a logic chip to attempt to retrieve issuer country information stored on the payment card; wherein the rate request message further includes an issuer country indicator representative of the issuer country information retrieved or derived from information retrieved from the payment card.

11. The system of claim 1, further comprising one or more output peripheral devices, wherein the instructions are executable, in the absence of other identification of a conversion currency in the transaction terminal system, to identify to a user via the one or more output peripheral devices a plurality of available conversion currencies for selection by the user of a conversion currency, wherein the conversion currency indicator is representative of the user selected conversion currency.

12. The system of claim 11, wherein the instructions are executable to respond to a rate response message indicative that the user selected currency is not a billing currency for a payment card to output via the one or more output peripheral devices an alert to the user and to prompt the user to confirm the user selected conversion currency.

13. The system of claim 1, wherein the instructions are executable, on receipt of a rate response message identifying a conversion currency, conversion rate and a converted transaction amount for that conversion currency, to output via the one or more output peripheral devices an indication of the conversion currency, a conversion rate and a converted transaction amount for that conversion currency and to prompt the user to confirm the indicated conversion currency, the conversion rate and the converted transaction amount for the conversion currency.

14. The system of claim 13, wherein the instructions are executable to respond to user confirmation of the indicated conversion currency, the conversion rate and the converted transaction amount for the conversion currency to effect the transaction using the input transaction details, the indicated conversion currency, the conversion rate and the converted transaction amount for the conversion currency.

15. The system of claim 14, wherein the instructions are executable to cause clearing information for the indicated conversion currency, the conversion rate and the converted transaction amount for the conversion currency to be transmitted to a remote external system.

16. The system of claim 11, wherein the one or more output peripheral devices comprise a display device.

17. The system of claim 1, comprising a printer operable to print a receipt on completion of a transaction using the transaction details.

18. A currency conversion host system comprising:
   a hardware host communications unit configured to connect to a transaction terminal system, wherein the currency conversion host system is configured to receive, from the transaction terminal system, a plurality of rate request message types;
   a host processor; and
   memory having stored thereon instructions executable by the host processor to perform operations comprising:
      causing a rate request message to be received from the transaction terminal system, wherein the rate request message includes:
         a rate request message type indicator indicative of one of the plurality of rate request message types, and
         a currency conversion indicator in a currency conversion field; and
         wherein the rate request message type indicator is usable by the currency conversion host system to interpret the currency conversion indicator;
      determining a conversion rate and a converted transaction amount in response to the rate request message that includes the currency conversion indicator or determining a conversion currency, a conversion rate and a converted transaction amount for the determined conversion currency in response to the rate request message without the currency conversion indicator; and
      causing a rate response message to be transmitted to the transaction terminal system that includes a conversion currency indicator, a conversion rate indicator and the converted transaction amount value.

19. The system of claim 18, wherein the currency conversion host system is operable to maintain conversion rates for respective available conversion currencies.

20. The system of claim 18, wherein the instructions are further executable to provide a mapping between a payment card issuer and an associated billing currency, wherein the rate request message includes input payment card details and the instructions are executable, in response to a rate request message without an indicated conversion currency, to determine a conversion currency, a conversion rate and a converted transaction amount for the determined conversion currency by accessing the mapping using payment card issuer information from the input payment card details.

21. The system of claim 18, wherein the instructions are executable to respond to a rate request message, wherein the currency conversion indicator is indicative of a currency by determining an available conversion rate and a converted transaction amount.

22. The system of claim 18, wherein the instructions are executable to respond to a rate request message that includes a second rate request message type indicator and does not include a currency conversion indicator by accessing stored billing currency mapping information to determine a billing currency for a payment card, and by determining an available conversion rate and a converted transaction amount.

23. The system of claim 18, wherein the instructions are executable, for a rate request message that includes an issuer country indicator, to respond to the rate request message by accessing a stored country to currency mapping information to identify a currency and by determining an available conversion rate and converted transaction amount.

24. The system of claim 21, wherein the instructions are executable to determine if an identified currency is not a system supported currency for direct currency conversion, and, in that event, to determine a default currency using stored default currency mapping information and to determine an available conversion rate and converted transaction amount based on the default currency rather than the identified currency.

25. The system of claim 18, wherein the instructions are further executable:
   to respond to a rate request message including a fifth rate request message type indicator, input payment card details and a user selected currency to use the mapping to use stored payment card issuer to billing currency mapping information to determine a billing currency associated with a payment card issuer identified in the input payment card details;
   to compare the determined billing currency with the user selected conversion currency; and
   to transmit a rate response message indicating whether or not the determined billing currency corresponds to the user selected billing currency.

26. A currency conversion system comprising:
   at least one transaction terminal system including:
      one or more input peripheral devices configured to receive payment card details and transaction details,
      a hardware communications unit configured to connect to a remote host system, wherein the remote host system is configured to process a plurality of rate request message types,
      a processor; and
      memory having stored thereon instructions executable by the processor to perform operations comprising:
         causing a rate request message to be transmitted to the remote host system via the hardware communications unit, wherein the rate request message is usable by the remote host system to identify a currency conversion rate; and
processing a response message received from the remote host system that includes the currency conversion rate,
wherein the rate request message includes:
a rate request message type indicator indicative of one of the plurality of rate request message types, and
a currency conversion indicator in a currency conversion field; and
wherein the rate request message type indicator is usable by the remote host system to interpret the currency conversion indicator in order to identify the currency conversion rate; and
the remote host system including:
a hardware host communications unit configured to connect a transaction terminal system; and
a host processor; and
memory having stored thereon instructions executable by the processor to perform operations comprising:
causing the rate request message to be received from the transaction terminal;
determining a conversion rate and a converted transaction amount in response to the rate request message that includes the currency conversion indicator or determining a conversion currency, a conversion rate and a converted transaction amount for the determined conversion currency in response to the rate request message without the currency conversion indicator; and
causing a rate response message to be transmitted to the transaction terminal system that includes a currency conversion indicator, a conversion rate indicator and a converted transaction amount value.

27. A method of operating a transaction terminal system comprising the transaction terminal system:
receiving payment card details and transaction details;
transmitting a rate request message to a host system to identify a currency conversion rate, wherein the host system is configured to process a plurality of rate request message types, and wherein a rate request message includes:
a rate request message type indicator indicative of one of the plurality of rate request message types, and
a currency conversion indicator in a currency conversion field, wherein the rate request message type indicator is usable by the remote host system to interpret the currency conversion indicator in order to identify the currency conversion rate; and
receiving a response message from the host system.

28. The method of claim 27, further comprising:
storing at least one of a reference country indicator or a reference currency indicator for the transaction terminal system;
identifying, in the transaction terminal system, whether received payment card details are indicative of a payment card for which an issuer country or a billing currency is a reference country or a reference currency, and
in the event that that the indicated payment card issuer country or the indicated payment card billing currency is the reference country or the reference currency, processing a transaction in a currency corresponding to a currency for the reference country or to the reference currency without transmitting a rate request message.

29. The method of claim 28, further comprising:
storing the reference currency indicator for the transaction terminal system;
identifying, in the transaction terminal system, whether received payment card details are indicative of a payment card for which a billing currency is the reference currency, and
in the event that an indicated payment card billing currency is the reference currency, processing a transaction in the reference currency without transmitting a rate request message.

30. The method of claim 29, further comprising:
storing indications of reference payment card issuers for which a billing currency is the reference currency; and
comparing payment card issuer information in the received payment card details to the reference payment card issuer indications to determine whether the received payment card details are indicative of a payment card for which a billing currency is the reference currency.

31. The method of claim 30, further comprising:
storing a reference country indicator for the transaction terminal system;
identifying, in the transaction terminal system, whether received payment card details are indicative of a payment card for which an issuer country is the reference country, and
in the event that an indicated payment card issuer country is the reference country, processing a transaction in a currency corresponding to a currency for the reference country without transmitting a rate request message.

32. The method of claim 31, further comprising:
storing indications of reference payment card issuers for which an issuer country is the reference country; and
comparing payment card issuer information in the received payment card details to the reference payment card issuer indications to determine whether the received payment card details are indicative of a payment card for which an issuer country is the reference country.

33. The method of claim 27, further comprising:
transmitting an authorisation request message including information indicative of the received payment card details and transaction details to a remote host system, and receiving an authorisation response message containing information indicative of a billing currency for a payment card: and
transmitting a rate request message to the host system for a currency conversion rate for the billing currency, the rate request message including a billing currency indicator in the currency conversion field and the rate request message type indicator is indicative that the currency conversion field contains a currency indicator.

34. The method of claim 27, wherein a payment card comprises a logic chip, the method further comprising:
attempting to retrieve billing currency information stored on the payment card; and
wherein the currency conversion indicator is representative of a billing currency retrieved or derived from information retrieved from the payment card.

35. The method of claim 27, further comprising:
selectively, and in the absence of a conversion currency being identified in the transaction terminal system, transmitting a rate request message that includes a second rate request message type indicator and does not include a currency conversion indicator.

36. The method of claim 27, wherein a payment card comprises a logic chip, the method further comprising:
attempting to retrieve issuer country information stored on the payment card; and transmitting a rate request message that further includes an issuer country indicator representative of an issuer country retrieved or derived from information retrieved from the payment card.

37. The method of claim 27, further comprising:
in the absence of other identification of a conversion currency in the transaction terminal system, identifying to a user via an output interface of the transaction terminal system, a plurality of available conversion currencies for selection by the user of a conversion currency, and
in response to user selection of the conversion currency, transmitting to the host system a rate request message that includes the currency conversion indicator representative of the user selected conversion currency.

38. The method of claim 37, further comprising:
responding to a rate response message indicative that the user selected currency is not a billing currency for a payment card by outputting via the output interface an alert message to the user and to prompt the user to confirm the user selected conversion currency.

39. The method of claim 27, further comprising:
on receipt of a rate response message, identifying a conversion currency, a conversion rate and a converted transaction amount for that conversion currency, outputting via the output interface an indication of the conversion currency, a conversion rate and a converted transaction amount for that conversion currency and prompting the user to confirm the indicated conversion currency, the conversion rate and the converted transaction amount for the conversion currency.

40. The method of claim 39, further comprising:
responding to user confirmation of the indicated conversion currency, the conversion rate and the converted transaction amount for the conversion currency to effect the transaction using input transaction details, the indicated conversion currency, the conversion rate and the converted transaction amount for the conversion currency.

41. The method of claim 40, further comprising:
causing clearing information for the indicated conversion currency, the conversion rate and the converted transaction amount for the conversion currency to be transmitted to a remote external system.

42. The method of claim 27, further comprising:
printing a receipt on completion of a transaction using transaction details.

43. A method comprising:
receiving, at a currency conversion host system, a rate request message from a transaction terminal, wherein the currency conversion host system is configured to process a plurality of rate request message types, wherein a rate request message includes:
a rate request message type indicator indicative of one of the plurality of rate request message types, and
a currency conversion indicator in a currency conversion field, and
wherein the rate request message type indicator is usable by the remote host system to interpret the currency conversion indicator;
determining a conversion rate and a converted transaction amount in response to a rate request message that includes the currency conversion indicator or determining a conversion currency, a conversion rate and a converted transaction amount for the determined conversion currency in response to a rate request message without the currency conversion indicator; and
transmitting to the transaction terminal system a rate response message that includes a currency conversion indicator, a conversion rate indicator and a converted transaction amount value.

44. The method of claim 43, further comprising:
maintaining conversion rates for respective available conversion currencies.

45. The method of claim 43, further comprising:
providing a mapping between payment card issuers and associated billing currencies, and
in response to a rate request message including input payment card details and without an indicated conversion currency, determining a conversion currency, a conversion rate and a converted transaction amount for the determined conversion currency by accessing the mapping using payment card issuer information from the input payment card details.

46. The method of claim 43, further comprising:
responding to a rate request message that includes the currency conversion indicator indicative of a currency by determining an available conversion rate and a converted transaction amount.

47. The method of claim 43, further comprising:
responding to a rate request message that includes a second rate request message type indicator and does not include a currency conversion indicator, by accessing stored billing currency mapping information to identify a billing currency for the payment card and by determining a conversion rate and a converted transaction amount.

48. The method of claim 43, wherein the rate request message includes an issuer country indicator;
the method further comprising:
responding to the rate request message by accessing stored country to currency mapping information and by determining an available conversion rate and converted transaction amount.

49. The method of claim 46, further comprising:
determining if an identified currency is not a system supported currency for direct currency conversion, and, in that event, determining a default currency using stored default currency mapping information and determining an available conversion rate and the converted transaction amount based on the default currency rather than the identified currency.

50. The method of claim 43, further comprising:
providing a mapping between a payment card issuer and an associated billing currency;
using the mapping to determine a billing currency associated with a payment card issuer identified in input payment card details associated with the rate request message;
comparing the determined billing currency with a user selected conversion currency; and
transmitting a rate response message indicating whether or not the determined billing currency corresponds to the user selected conversion currency.

* * * * *